US012811614B2

(12) United States Patent
Lee et al.

(10) Patent No.: US 12,811,614 B2
(45) Date of Patent: Nov. 24, 2026

(54) APPARATUS INCLUDING SM IN WIRELESS COMMUNICATION SYSTEM

(71) Applicant: Samsung Electronics Co., Ltd., Suwon-si (KR)

(72) Inventors: Heesung Lee, Suwon-si (KR); Jaekwang Kwon, Suwon-si (KR); Dongki Kim, Suwon-si (KR); Seongkyun Kim, Suwon-si (KR); Hyohyun Nam, Suwon-si (KR); Kyeongho Yeom, Suwon-si (KR); Daeyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 18/950,445

(22) Filed: Nov. 18, 2024

(65) Prior Publication Data

US 2025/0167816 A1 May 22, 2025

(30) Foreign Application Priority Data

Nov. 20, 2023 (KR) ........................ 10-2023-0161056

(51) Int. Cl.
*H04B 1/00* (2006.01)
*H04B 1/16* (2006.01)

(52) U.S. Cl.
CPC ......... *H04B 1/0078* (2013.01); *H04B 1/0003* (2013.01); *H04B 1/1607* (2013.01)

(58) Field of Classification Search
USPC .......................................................... 455/552
See application file for complete search history.

(56) References Cited

U.S. PATENT DOCUMENTS 9,225,362 B2 12/2015 Drogi et al.
9,571,135 B2 2/2017 Langer
(Continued)

FOREIGN PATENT DOCUMENTS

EP 3675355 B1 7/2023
KR 10-2014-0142466 A 12/2014
(Continued)

OTHER PUBLICATIONS

International Search Report and Written Opinion of the International Searching Authority dated Feb. 28, 2025, in connection with International Application No. PCT/KR2024/096535, 7 pages.
(Continued)

*Primary Examiner* — Nathan P Brittingham

(57) ABSTRACT

The disclosure relates to a 5G or 6G communication system for supporting a data transmission rate higher than a 4G communication system such as LTE. An electronic device in a wireless communication system may include a PA and an SM configured to supply power to the PA, wherein the SM may include a linear SM to which a signal for an envelope tracking (ET) is input, and a first SM connected to the linear SM and comprising a first converter for direct current (DC)-DC conversion and at least one lumped element connected to the first converter, and the first SM may be configured to convert the signal for the ET into a first digital signal, to generate a first control signal for the first converter based on a change of a voltage value of the first digital signal, to generate a second digital signal by delaying the first digital signal by a predetermined clock, and to control the at least one lumped element based on the first digital signal and the second digital signal to adjust a current output from the first SM.

20 Claims, 23 Drawing Sheets

(56) References Cited

U.S. PATENT DOCUMENTS

| | | | | |
|---|---|---|---|---|
| 9,590,665 | B2 * | 3/2017 | Lim | H03F 3/217 |
| 9,685,912 | B2 | 6/2017 | Kim et al. | |
| 10,361,659 | B2 | 7/2019 | Henzler et al. | |
| 10,985,711 | B2 | 4/2021 | Balteanu et al. | |
| 2016/0094186 | A1 | 3/2016 | Cohen | |
| 2016/0277045 | A1 * | 9/2016 | Langer | H03F 1/0222 |
| 2017/0047953 | A1 | 2/2017 | Balteanu et al. | |
| 2018/0152144 | A1 * | 5/2018 | Choo | H03F 1/0227 |
| 2020/0343865 | A1 * | 10/2020 | Balteanu | H03F 3/245 |
| 2021/0250002 | A1 | 8/2021 | Chang et al. | |
| 2024/0313714 | A1 * | 9/2024 | Banno | H10W 44/20 |

FOREIGN PATENT DOCUMENTS

| | | | |
|---|---|---|---|
| KR | 10-2015-0129722 | A | 11/2015 |
| KR | 10-2015-0136869 | A | 12/2015 |
| WO | 2013133170 | A1 | 9/2013 |

OTHER PUBLICATIONS

Kim, et al., "Envelope-Tracking Two-Stage Power Amplifier With Dual-Mode Supply Modulator for LTE Applications," IEEE Transactions on Microwave Theory and Techniques, vol. 16, No. 1, Jan. 2013, 11 pages.

* cited by examiner

APPARATUS INCLUDING SM IN WIRELESS COMMUNICATION SYSTEM

CROSS-REFERENCE TO RELATED APPLICATION

This application is based on and claims priority under 35 U.S.C. § 119 to Korean Patent Application No. 10-2023-0161056, filed on Nov. 20, 2023, in the Korean Intellectual Property Office, the disclosure of which is herein incorporated by reference in its entirety.

BACKGROUND

1. Field

The disclosure relates to a wireless communication system (or a mobile communication system). Specifically, the disclosure relates to an apparatus including a supply modulator (SM) in a wireless communication system.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

As beamforming technologies have been adopted in 5G (or new radio (NR)), electronic devices may need to transmit signals having high peak to average power ratios (PAPR). To output a high PAPR in a designed resonant frequency, a PA may need to be supplied with high-voltage power from an SM.

There is an issue in that a linear SM among SMs is capable of operating in a relatively broader frequency band compared to other SMs but consumes a relatively large amount of power since it has a relatively lower power efficiency than other SMs.

According to an embodiment, an electronic device in a wireless communication system may include a PA and a supply modulator (SM) configured to supply power to the PA, and the SM may include a linear SM to which a signal for the envelope tracking (ET) is input, and a first SM connected to the linear SM and comprising a first converter for direct current (DC)-DC conversion and at least one lumped element connected to the first converter, and the first SM may be configured to convert the signal for the ET into a first digital signal, to generate a first control signal for the first converter based on a change of a voltage value of the first digital signal, to generate a second digital signal by delaying the first digital signal by a predetermined clock, and to control the at least one lumped element based on the first digital signal and the second digital signal to adjust a current output from the first SM.

According to an embodiment, an electronic device in a wireless communication system may include a PA and a supply modulator (SM) configured to supply power to the PA, and the SM may further include a linear SM to which a signal for the envelope tracking (ET) is input, a first SM connected to the linear SM, the first SM including a first converter for direct current (DC)-DC conversion and at least one lumped element connected to the first converter, and a second SM including a second converter for DC-DC conversion and an inductor connected to the second converter, the inductor may has a constant inductance value, and the first SM may be configured to convert the signal for the ET into a first digital signal, to generate a first control signal for the first converter based on a change of a voltage value of the first digital signal, to generate a second digital signal by delaying the first digital signal by a predetermined clock, and to control the at least one lumped element based on the first digital signal and the second digital signal to adjust a current output from the first SM.

According to an embodiment, an electronic device may reduce or minimize the power consumption of an SM that supplies power to a PA.

In addition, various effects directly or indirectly recognized from the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Identical or like reference numerals in the drawings denote identical or like components.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to the accompanying drawings. This is not to limit the disclosure to a predetermined embodiment, and it should be understood that various modifications, equivalents, and/or alternatives of the embodiments of the disclosure are included.

Figure 1:
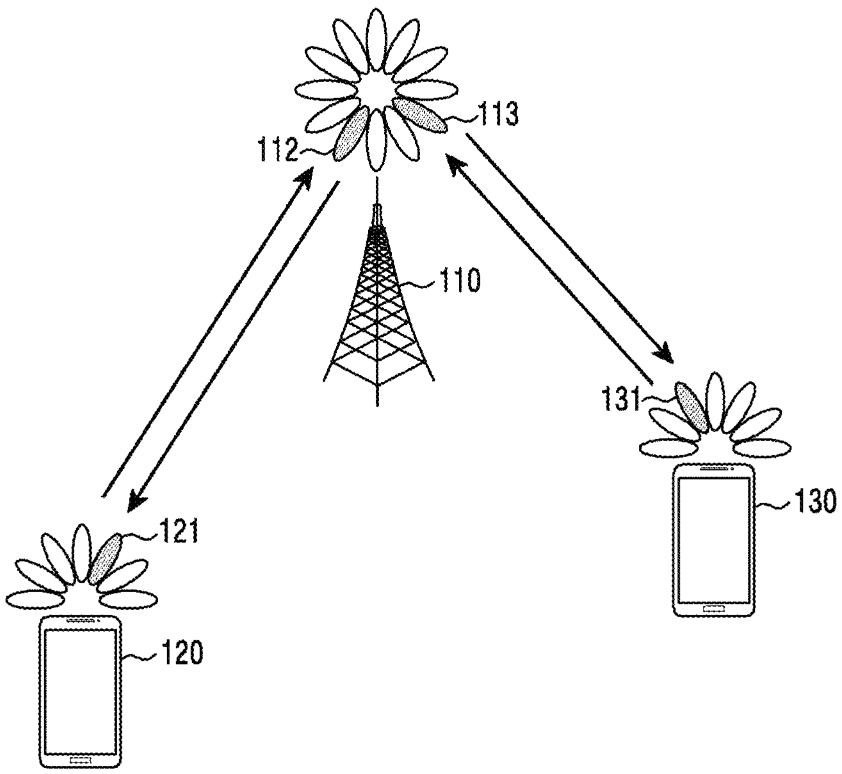
FIG. 1 illustrates a diagram of a wireless communication system according to an embodiment of the disclosure.

FIG. 1 illustrates a diagram of a wireless communication system according to an embodiment of the disclosure.

FIG. 1 illustrates a base station 110, a user equipment (UE) 120, and a UE 130, as some of the nodes that use wireless channels in a wireless communication system. Although FIG. 1 illustrates a single base station, another base station which is the same as or similar to the base station 110 may be further included.

The base station 110 may be a network infrastructure that provides wireless access to the UEs 120 and 130. The base station 110 may have a coverage area, defined by a predetermined geographical area based on the distance in which the base station 110 is capable of transmitting a signal. The base station 110 may be referred to as an "access point (AP)", an "eNodeB (eNB)", a "5th generation node", a "wireless point", a "transmission/reception point (TRP)", or other terms having technical meanings equivalent thereto, as well as a base station.

Each of the UEs 120 and 130 may be a device used by a user, and may perform communication with the base station 110 via a wireless channel. Depending on the case, at least one of the UEs 120 and 130 may operate without being handled by a user. That is, at least one of the UEs 120 and 130 is a device that performs machine type communication (MTC), and may not be carried by a user. The UE 120 and the UE 130 may each be referred to as a "user equipment (UE)", a "mobile station", a "subscriber station", a "customer-premises equipment (CPE)", a "remote terminal", a "wireless terminal", an "electronic device", a "user device", or other terms having technical meanings equivalent thereto, as well as a terminal.

The base station 110, the UE 120, and the UE 130 may transmit and receive wireless signals in millimeter wave (mmWave) bands (e.g., 28 GHz, 30 GHz, 38 GHz, 60 GHz). In this instance, in order to improve a channel gain, the base station 110, the UE 120, and the UE 130 may perform beamforming. Here, the beamforming may include transmission beamforming and reception beamforming. That is, the base station 110, the UE 120, and the UE 130 may apply directivity to transmission signals or reception signals. To this end, the base station 110 and the UEs 120 and 130 may select serving beams 112, 113, 121, and 131 via a beam search procedure or a beam management procedure. After the serving beams 112, 113, 121, and 131 are selected, subsequent communication may be performed using resources which are in the quasi-co-located (QCL) relationship with resources used for transmitting the serving beams 112, 113, 121, and 131.

Figure 2:
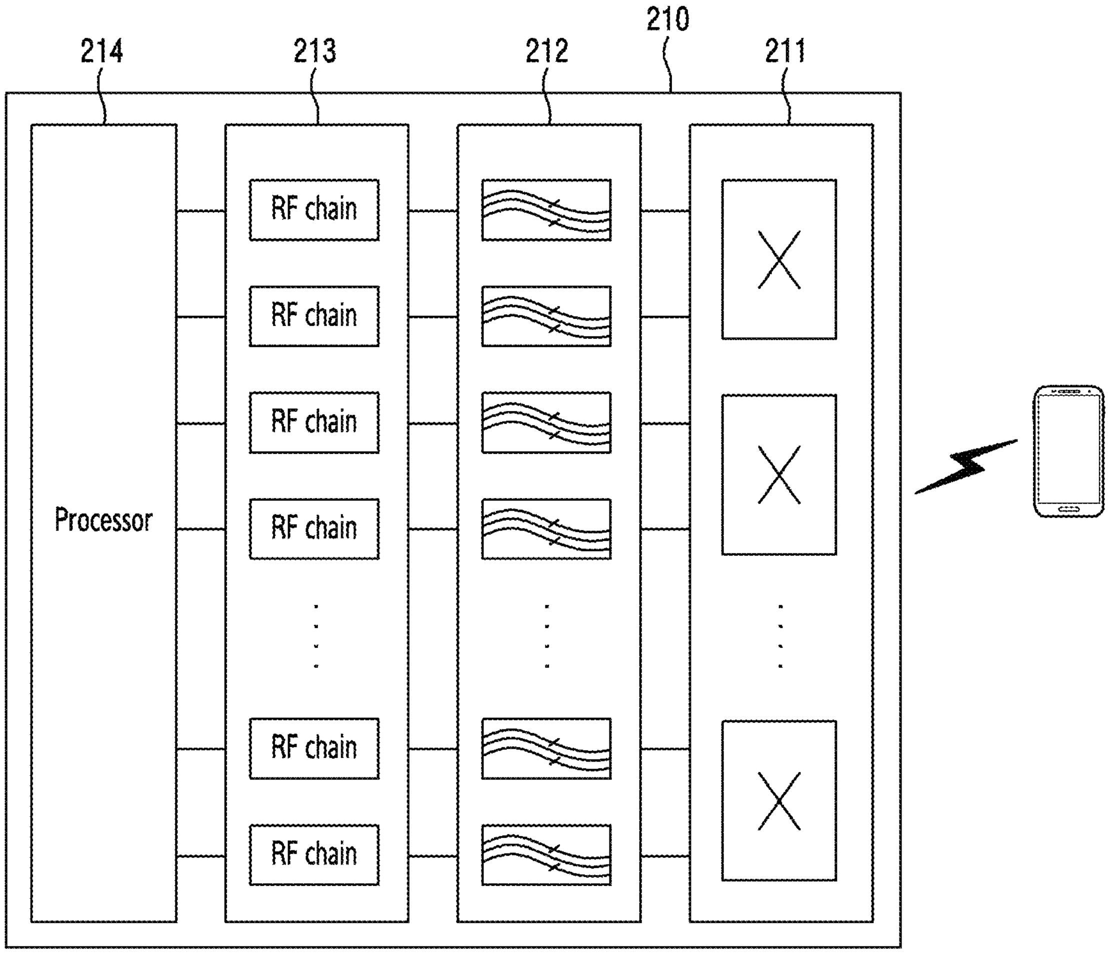
FIG. 2 illustrates a diagram of the configurations of an electronic device according to an embodiment of the disclosure.

FIG. 2 illustrates a diagram of the configurations of an electronic device according to an embodiment of the disclosure.

Referring to FIG. 2, the functional configuration of the electronic device 210 according to an embodiment is illustrated. The electronic device 210 may include an antenna unit 211, a filter 212, a radio frequency (RF) processor 213, and/or a processor 214 (or, controller).

According to an embodiment, the antenna unit 211 may include a plurality of antennas (e.g., antenna elements). An antenna may perform functions for transmitting or receiving a signal via a wireless channel. The antenna may include an emitter made up of a conductor or conductive pattern formed on a substrate (e.g., a printed circuit board (PCB)). The antenna may emit an up-converted signal on a wireless channel, or may obtain a signal emitted from another device. Each antenna may be referred to as an antenna element. According to an embodiment, the antenna unit 211 may include an antenna array (e.g., a sub array) in which a plurality of antenna elements are disposed in an array. The antenna unit 211 may be electrically connected to the filter 212 via RF signal lines. The antenna unit 211 may be embedded in a PCB including a plurality of antenna elements. The PCB may include a plurality of RF signals to connect respective antenna elements and the filters of the filter 212. The RF signals may be referred to as a feeding network. The antenna unit 211 may provide a received signal to the filter 212, or may emit a signal provided from the filter 212 to the air. The antenna given in the structure according to an embodiment of the disclosure may be included in the antenna unit 211.

According to an embodiment, the antenna unit 211 may include at least one antenna module having a dual-polarized antenna. The dual-polarized antenna may be, for example, a cross-pol (x-pol) antenna. A dual-polarized antenna may include two antenna elements corresponding to different polarizations from each other. For example, the dual-polarized antenna may have a first antenna element having a polarization of +45° and a second antenna element having a polarization of −45°. Not to mention that other orthogonal polarizations may also be used in addition to the +45° and −45° polarizations. Each antenna element may be connected to a feeding line, and may be electrically connected to the filter 212, the RF processor unit 213, and the processor 214 which will be described later.

According to an embodiment, the dual-polarized antenna may be a patch antenna (or microstrip antenna). The dual-polarized antenna is in the form of a patch antenna, thereby facilitating the implementation of an array antenna and integration. Two signals having different polarizations from each other may be input to antenna ports, respectively. Antenna ports may correspond to antenna elements, respectively. To achieve high efficiency, it may be required to optimize the relationships with a co-pol characteristic and a cross-pol characteristic between the two signals having different polarizations. In a dual-polarized antenna, a co-pol characteristic is a characteristic associated with a predetermined polarization component and a cross-pol characteristic is a characteristic associated with a polarization component, different from the predetermined polarization component.

An antenna (e.g., an antenna element, a sub-array, an antenna array) of an antenna device including a detachable PCB according to an embodiment may be included in the antenna unit 211. For example, a first conductive member of the antenna device or the first conductive member and a second conductive member according to an embodiment of the disclosure may refer to an antenna element, and may be included in the antenna unit 211 of FIG. 2.

The filter 212 may perform filtering in order to transfer a signal of an intended frequency. The filter 212 may perform a function for selectively identifying a frequency by forming resonance. According to embodiments, the filter 212 may form resonance via a cavity structurally including a dielectric. In addition, in some embodiments, the filter 212 may form resonance via elements that forms inductance or capacitance. In addition, in some embodiments, the filter 212 may include an elastic filter such as a bulk acoustic wave (BAW) filter or a surface acoustic wave (SAW) filter. The filter 212 may include at least one of a band pass filter, a low pass filter, a high pass filter, or a band reject filter. That is, the filter 212 may include RF circuits for obtaining signals of a frequency band for transmission and a frequency band for reception. The filter 212 according to various embodiments may electrically connect the antenna unit 211 and the RF processor 213.

The RF processor 213 may include a plurality of RF paths. An RF path may be a unit of a path through which a signal received via an antenna or a signal emitted via an antenna passes. At least one RF path may be referred to as an RF chain. An RF chain may include a plurality of RF elements. RF elements may include an amplifier, a mixer, an oscillator, a DAC, an ADC, or the like. For example, the RF processor 213 may include an up-converter that upconverts a digital transmission signal of a baseband into a transmission frequency, and a digital-to-analog converter (DAC) that converts an upconverted digital transmission signal into an analog RF transmission signal. The up-converter and the DAC may be a part of a transmission path. The transmission path may further include a power amplifier (PA) or a coupler (or combiner). In addition, for example, the RF processor 213 may include an analog-to-digital converter (ADC) that converts an analog RF reception signal into a digital reception signal and a downconverter that converts a digital reception signal into a digital reception signal of a baseband. The ADC and the down-converter may be a part of a reception path. The reception path may further include a low-noise amplifier (LNA) or a coupler (or divider). The RF components of the RF processor may be implemented in a PCB. The antennas and the RF components of the RF processor may be implemented in a PCB, and filters between PCBs are repetitively coupled with each other and a plurality of layers are formed.

A radio frequency integrated circuit (RFIC) and a package board (PKG) of the antenna device including a detachable PCB according to an embodiment of the disclosure may be included in the RF processor 213 of FIG. 2. That is, the RF processor 213 may include a radio frequency integrated circuit (RFIC), as an RF element for mmWave. As described in the disclosure, the RFIC may be formed as an RFIC chip coupled with a package board and may be coupled with a first PCB, or the RFIC may be directly coupled with the first PCB.

The processor 214 (or, controller) may control the overall operations of the electronic device 210. The processor 214 may include various modules for performing communication. The processor 214 may include at least one processor such as a modem. The processor 214 may include modules for digital signal processing. For example, the processor 214 (or, controller) may include a modem. In the case of data transmission, the processor 214 may generate complex symbols by encoding and modulating a transmission bitstream. In addition, in the case of data reception, the processor 214 may restore a reception bitstream by demodulating and decoding a baseband signal. The processor 214 (or, controller) may perform the functions of a protocol stack that the communication standard requires.

Figure 3:
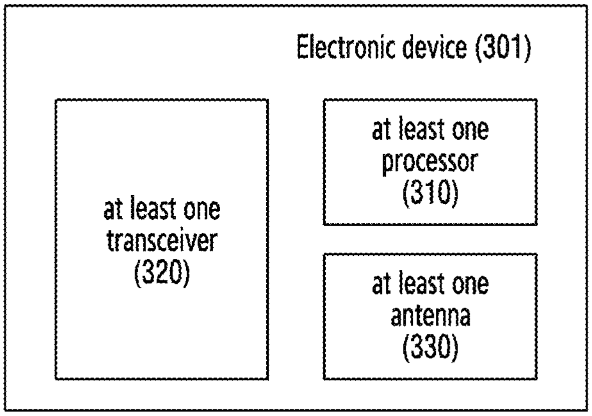
FIG. 3 illustrates a diagram of the configuration of an electronic device according to an embodiment of the disclosure.

FIG. 3 illustrates a diagram of the configuration of an electronic device according to an embodiment of the disclosure.

Referring to FIG. 3, an electronic device 301 according to an embodiment may include at least one processor 310, at least one transceiver 320, and/or at least one antenna 330.

The electronic device 301 of the disclosure may be at least one of the base station 110, the UE 120, or the UE 130 of FIG. 1. For example, an SM included in the electronic device 301 described below with reference to FIG. 3 may substantially correspond to an SM included in the base station 110. As another example, the SM included in the electronic device 301 may correspond to an SM included in the UE 120.

According to an embodiment, at least one processor 310 may include at least one communication processor. According to an embodiment, the at least one processor 310 may be electrically connected to at least one transceiver 320, and may generate or process a signal (e.g., a baseband signal). For example, the at least one processor 310 may transmit a signal (e.g., a baseband signal) to the at least one transceiver 320 or may receive a signal (e.g., a baseband signal) from the at least one transceiver 320.

According to an embodiment, the at least one transceiver 320 may be electrically connected to at least one antenna 330. According to an embodiment, the at least one transceiver 320 may upconvert an intermediate frequency (IF) signal transmitted from the at least one processor 310 into a radio frequency (RF) signal, and may transmit an RF signal to the at least one antenna 330.

As another example, the at least one transceiver 320 may receive an RF signal from the at least one antenna 330, may down-convert an RF signal into an IF signal, and may transmit an IF signal to the at least one processor 310.

According to an embodiment, the at least one transceiver 320 may include at least one transmitter and/or at least one receiver. For example, the at least one transceiver 320 may include a first transceiver including a first transmitter and a first receiver, and the at least one transceiver 320 may include a second transceiver including a first transmitter.

According to an embodiment, the at least one transceiver 320 may process, transmit, and/or receive RF signals in various frequency bands. For example, each of the first transceiver and the second transceiver included in the at least one transceiver 320 may process an RF signal in a first frequency band.

For example, the first transceiver included in the at least one transceiver 320 may process an RF signal of the first frequency band, and the second transceiver may process an RF signal in the second frequency band. In an embodiment, the second frequency band may partially overlap the first frequency band. According to an embodiment, the at least one antenna 330 may include various types of antennas. For example, the at least one antenna 330 may include a patch antenna, a dipole antenna, a monopole antenna, a slit antenna, a laser direct structuring (LDS) antenna, and/or an inverted-F antenna (IFA).

For example, the at least one antenna 330 may include an antenna for transmitting and/or receiving a signal in a mmWave frequency band. For example, the at least one antenna 330 may include a plurality of antenna elements (e.g., patch antennas), and the plurality of antenna elements may form an array. The plurality of antenna elements forming an array may transmit and/or receive signals in a mmWave frequency band.

The term "at least one processor 310" in the disclosure may be replaced with another term indicating a configuration for processing data. For example, the term "at least one processor" may be replaced with a controller or a computing device.

The at least one transceiver 320 in the disclosure may include a radio frequency integrated circuit (RFIC) and/or an intermediate frequency integrated circuit (IFIC). For example, although FIG. 3 illustrates that the at least one transceiver 320 includes an RFIC and an IFIC, this is merely an example, and the at least one transceiver 320 may correspond to an RFIC. As another example, the at least one transceiver 320 may correspond to an IFIC.

Figure 4:
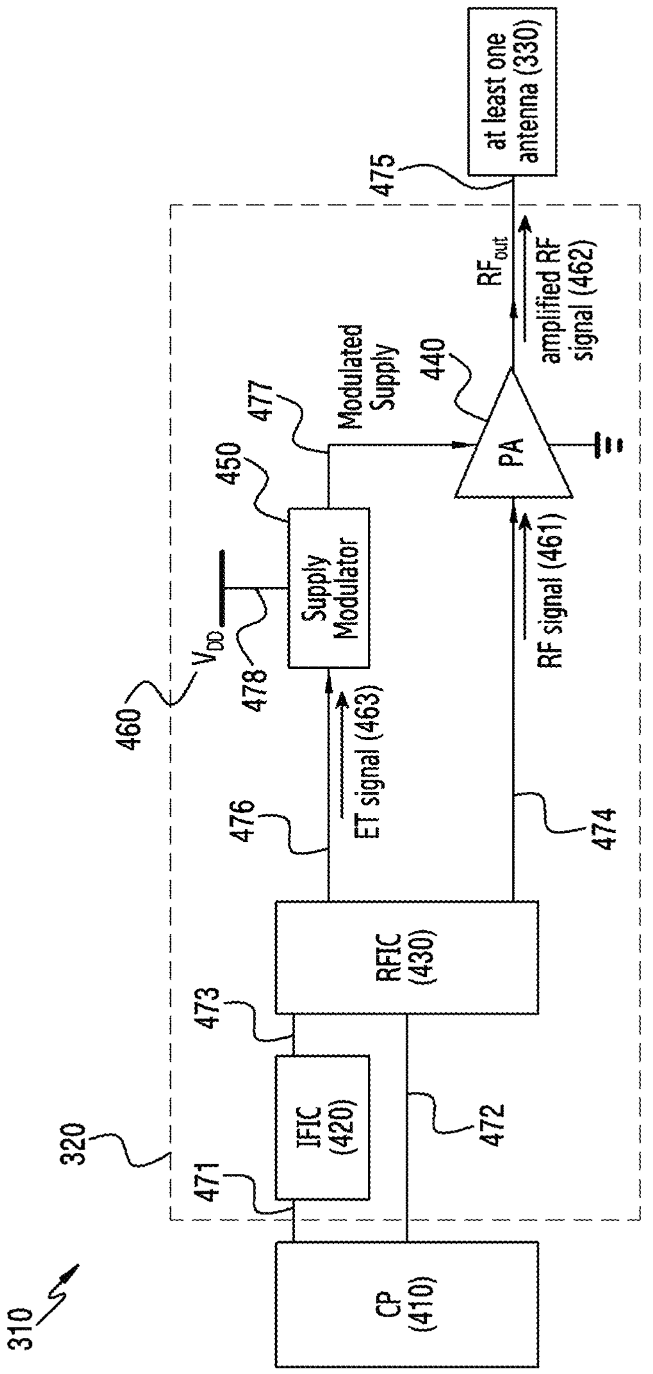
FIG. 4 illustrates a diagram of an SM and a PA according to an embodiment of the disclosure.

FIG. 4 illustrates a diagram of an SM and a PA according to an embodiment of the disclosure.

Referring to FIG. 4, the electronic device 301 according to an embodiment may include a communication processor (CP) 410, the at least one transceiver 320, and/or the at least one antenna 330.

According to an embodiment, the at least one transceiver 320 may include an IFIC 420, an RFIC 430, an SM 450, and/or a power amplifier (PA) 440.

According to an embodiment, the CP 410 may be electrically connected to the IFIC 420 and/or RFIC 430. For example, the CP 410 may be electrically connected to the IFIC 420 via a first conductive member 471, and the CP 410 may be electrically connected to the RFIC 430 via a second conductive member 472.

According to an embodiment, the IFIC 420 and the RFIC 430 may be electrically connected to a third conductive member 473.

According to an embodiment, the CP 410 may generate baseband (BB) signals, and may transmit or transfer the BB signals to the at least one transceiver 320. The at least one transceiver 320 may upconvert the obtained BB signals into RF signals.

For example, the CP 410 may transfer BB signals to the IFIC 420, and the IFIC 420 may upconvert the BB signals into intermediate frequency (IF) signals. The IFIC 420 may transfer the IF signals to the RFIC 430, and the RFIC 430 may convert the obtained IF signal into RF signals in a first frequency band (e.g., a frequency range (FR) 2 band). In an embodiment, the FR2 band may be referenced as a frequency band of 24.25 GHz or higher. For example, the CP 410 may transfer BB signals to the RFIC 430, and the RFIC 430 may convert the BB signals into RF signals in a second frequency band (e.g., FR1 band). In an embodiment, the FR1 band may be referenced as a frequency band of 7.125 GHz or lower.

For example, the CP 410 may be included in the at least one processor 310 of FIG. 3.

According to an embodiment, the IFIC 420 and/or the RFIC 430 may include a mixer for frequency conversion. For example, the IFIC 420 may include at least one mixer for converting BB signals received from the CP 410. For example, the RFIC 430 may include mixers for converting BB signals received from the CP 410 into RF signals and/or mixers for converting IF signals received from the IFIC 420 into RF signals.

According to an embodiment, the RFIC 430 may be electrically connected to the PA 440 via a fourth conductive member 474. The RFIC 430 may transmit an RF signal 461 to the PA 440 via the fourth conductive member 474.

According to an embodiment, the PA 440 may amplify the RF signal 461 received from the RFIC 430. For example, the PA 440 may convert the RF signal 461 received from the RFIC 430 into an amplified RF signal 462. The PA 440 may transfer or transmit the amplified RF signal 462 to the at least one antenna 330. For example, the PA 440 may be electrically connected to the at least one antenna 330 via a fifth conductive member 475, and may transmit the amplified RF signal 462 to the at least one antenna 330 via the fifth conductive member 475.

According to an embodiment, for the PA 440 to amplify the RF signal 461 and to generate the amplified RF signal, a voltage or a current may need to be applied from a power source 460 (e.g., a battery) in the electronic device 301.

In case that a direct current (DC) current (or voltage) from the power source 460 is directly received by or applied to the PA 440, power may be excessively consumed. Therefore, the electronic device 301 may include the SM 450 disposed between the RFIC 430 and the PA 440, and the SM 450 may transmit a current corresponding to the RF signal 461 to the PA 440 based on the DC current received from the power source 460. In this instance, when the current corresponding to the RF signal 461 is transferred or transmitted to the PA 440, unnecessary power consumption may be reduced or minimized. For example, the power source 460 may be electrically connected to the SM 450 via an eighth conductive member 478, and the power source 460 may supply power to the SM 450 via the eighth conductive member 478.

For example, the SM 450 may be electrically connected to the RFIC 430 via a sixth conductive member 476, and may receive an envelope tracking (ET) signal 463 via the sixth conductive member 476. In this instance, the ET signal 463 may be an alternating signal having a waveform or voltage that is substantially the same as the RF signal 461.

In an embodiment, the SM 450 may identify an optimal voltage value (or a voltage value by time) to amplify the RF signal 461 based on the ET signal 463, and may transmit or transfer a current having the identified optimal voltage value to the PA 440 via a seventh conductive member 477.

An optimal voltage value in the disclosure may be referenced as a voltage value that matches the voltage value of the RF signal 461, which is an alternating signal. Hereinafter, the concept of a voltage value that matches the voltage value of the RF signal 461 will be described in detail with reference to FIG. 5.

In the disclosure, a current or voltage that the SM 450 transfers to the PA 440 may be referenced substantially as a current or voltage used for operating the PA 440. As another example, a current or voltage that the SM 450 transfers to the PA 440 may be referenced as a current or voltage used for driving the PA 440 and amplifying a voltage.

In the disclosure, the RFIC 430 and the PA 440 are described as separate configurations, but this is merely an example. For example, the disclosure may be described based on the concept that the RFIC 430 includes the PA 440. In this instance, it may be described that the RF signal 461 is transferred to the PA 440 from a mixer included in the RFIC 430.

The term "PA" in the disclosure may be replaced with the term "power amplifier module (PAM)" or "PA circuit."

The term "conductive member" in the disclosure may be replaced with the term "conductive line", "conductive path", "conductive connection member". In addition, the first conductive member 471 to the eighth conductive member 478 may be a conductive line or conductive via implemented in a printed circuit board, and may be a flexible printed circuit board (FPCB), a C-clip, a pogo pin, or a flexible RF cable (FRC).

Figure 5:
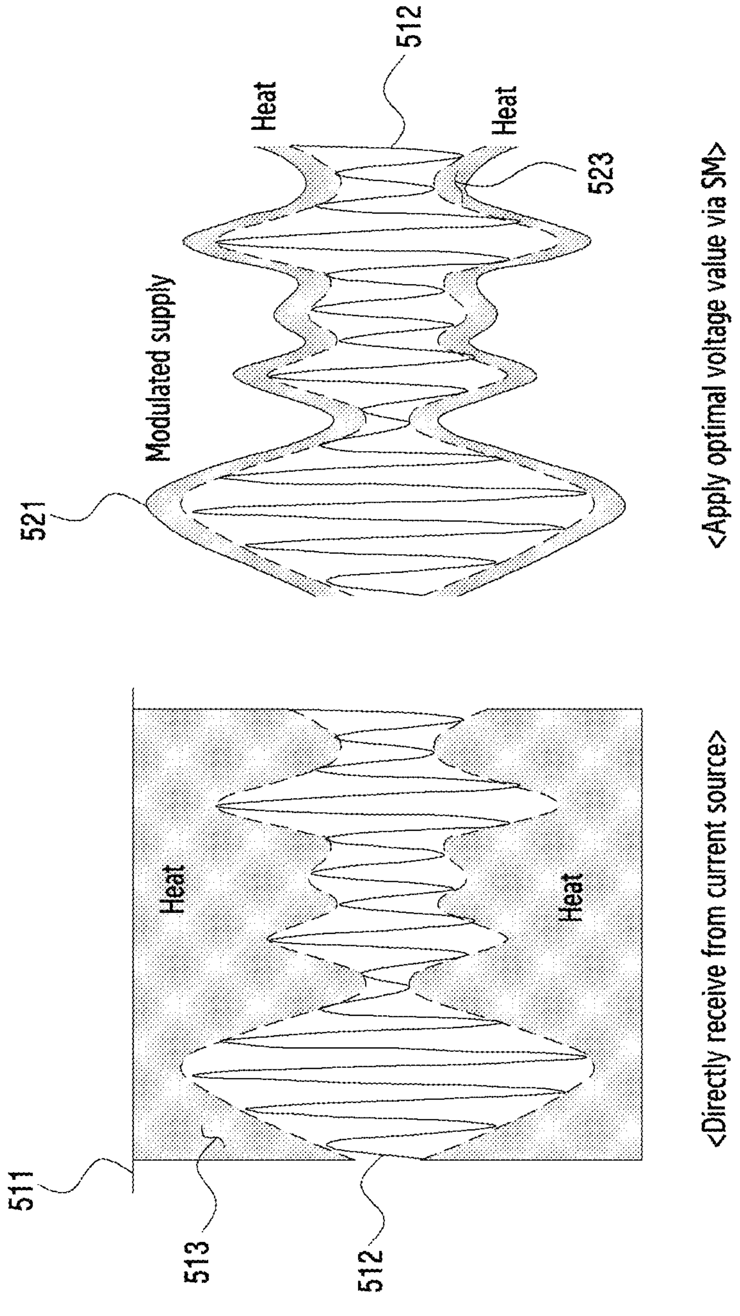
FIG. 5 illustrates a diagram of the comparison between the case in which a voltage for driving a PA is applied from a current source and the case in which a voltage for driving a PA is applied via an SM, according to an embodiment of the present disclosure.

FIG. 5 illustrates a diagram of the comparison between the case in which a voltage for driving a PA is applied from a current source and the case in which a voltage for driving a PA is applied via an SM, according to an embodiment of the disclosure.

Referring to FIG. 5, in the case where a voltage from the power source 460 is directly received by or applied to the PA 440 according to an embodiment, the power source 460 may apply a predetermined DC voltage 511 to the PA 440. In this case, a voltage 513 corresponding to a difference between a voltage 512 of the ET signal 463 and the predetermined DC voltage 511 may be dissipated as heat.

According to an embodiment, the SM 450 may generate an optimal voltage 521 based on the ET signal 463, and may apply the optimal voltage 521 to the PA 440, thereby reducing or minimizing a voltage 523 that may be dissipated as heat.

Therefore, the electronic device 301 may reduce or minimize power consumption in a manner that the SM 450 generates the optimal voltage 521 based on the ET signal 463 and applies the same to the PA 440, instead of directly applying a DC voltage to the PA 440 from the power source 460.

The optimal voltage in the disclosure may be referenced as a voltage that matches a waveform of the RF signal 461 or the ET signal 463. For example, the RF signal 461 or the ET signal 463 may be an alternating signal, and may have a different voltage value over time. The optimal voltage may be a voltage that matches or corresponds to the voltage value of the RF signal 461 or ET signal 463 that consecutively varies.

Figure 6A:
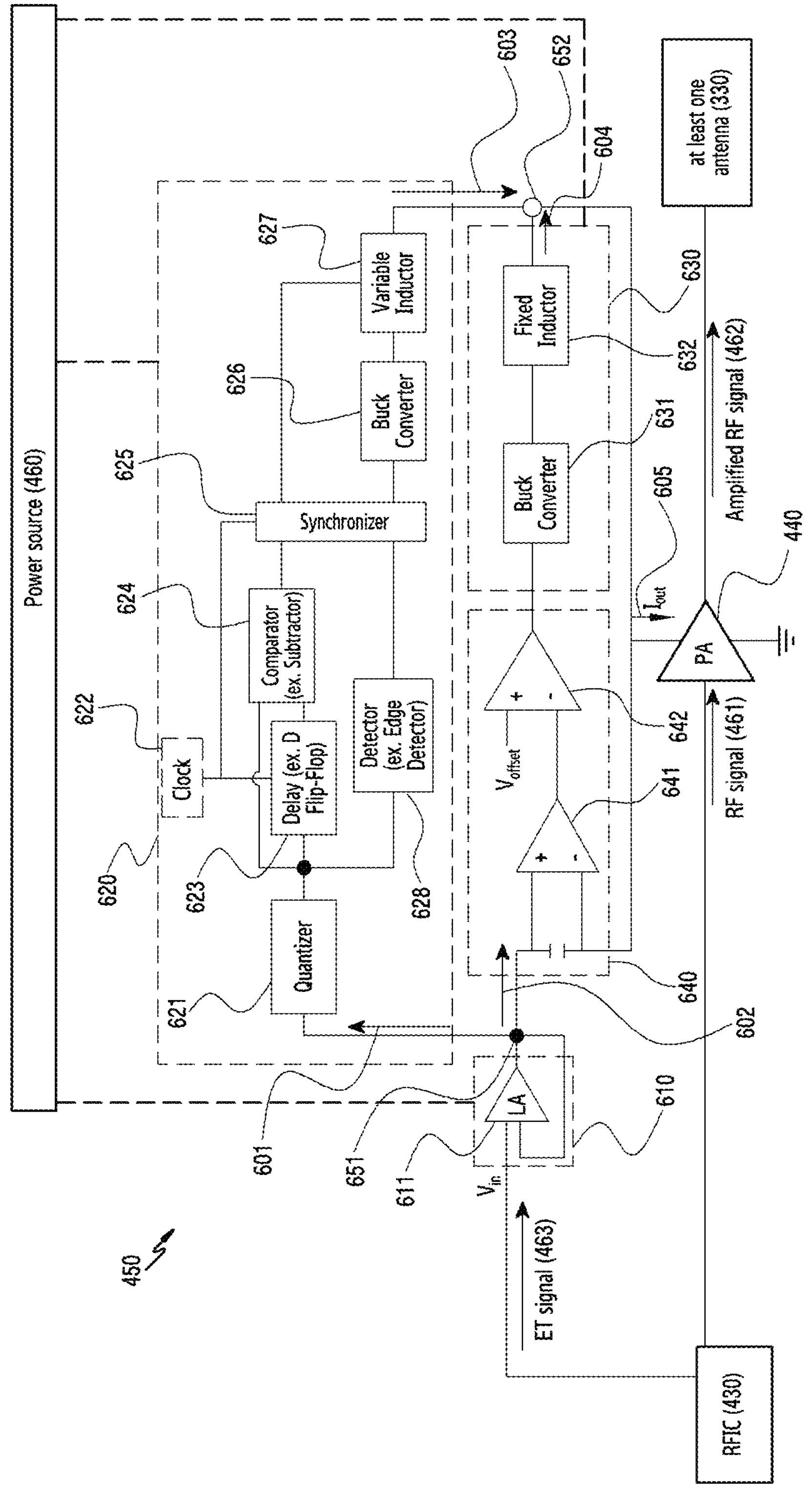
FIG. 6A illustrates a diagram of an SM for generating a voltage applied to a PA according to an embodiment of the disclosure.

FIG. 6A illustrates a diagram of an SM generating a voltage applied to a PA according to an embodiment of the disclosure.

Referring to FIG. 6A, the SM 450 according to an embodiment may include a linear SM 610, a first SM 620, a second SM 630, and/or a circuit 640.

According to an embodiment, the linear SM 610 may include a linear amplifier 611. For example, the linear amplifier 611 may amplify power received from the power source 460 based on the ET signal 463 received from the RFIC 430. For example, the linear amplifier 611 may amplify a voltage value of a current received from the power source 460 based on a waveform (or voltage) of the ET signal 463.

According to an embodiment, the linear SM 610 may be connected to the first SM 620, and may transfer (or, output) a first current 601 having a first voltage to the first SM 620. In an embodiment, the first current 601 having the first voltage may be a current that the linear SM 610 amplifies based on the ET signal 463.

According to an embodiment, the linear SM 610 may be electrically connected to the second SM 630 via the circuit 640, and may transfer or output a current having a predetermined voltage to the second SM 630. In an embodiment, the current having the predetermined voltage may be a current that the linear SM 610 amplifies based on the ET signal 463.

According to an embodiment, the first SM 620 may include various circuits for amplifying an obtained or received voltage. For example, the first SM 620 may include a first converter 626 (e.g., a buck converter) for DC-DC conversion and/or at least one lumped element 627 (e.g., a variable inductor).

As another example, the first SM 620 may include a quantizer module 621, a clock module 622, a delay module 623 (e.g., a D-Flip Flop), a detector 628 (e.g., an edge detector), a comparator 624 (e.g., a subtractor), a synchronization module 625, a first converter 626, and/or at least one lumped element 627.

According to an embodiment, the quantizer module 621 may convert the ET signal 463 into a first digital signal. For example, the quantizer module 621 may distinguish the voltage waveform of the ET signal 463 for each time period (period), and may quantize the voltage value of the ET signal distinguished for each time period. For example, the ET signal 463 is an alternating signal, having a voltage value that consecutively varies over time. The quantizer module 621 may distinguish the voltage waveform of the ET signal 463 for each time period (e.g., 2 seconds). In an embodiment, the voltage waveform of the ET signal 463 in a first time period may have consecutive voltage values between a first value (e.g., binary number 010) and a second value (e.g., binary number 011). In this case, the quantizer module 621 may determine the first value (e.g., binary number 010) that is greater than the consecutive voltage values as a value (e.g., a quantized value) corresponding to the first time period. As another example, the quantizer module 621 may identify a voltage value corresponding to the start point of each time period, and may determine a voltage value (e.g., a quantized voltage value) corresponding to each time period by rounding down the voltage value corresponding to the start point.

According to an embodiment, the clock module 622 may be referenced as a module or circuit that generates a predetermined clock. For example, the clock module 622 of the first SM 620 may generate a clock that has a predetermined cycle or a predetermined speed. For example, the clock module 622 may change the cycle of the generated clock from a first cycle to a second cycle which is shorter than the first cycle. For example, the clock module 622 may change the cycle of the generated clock from a first cycle to a second cycle which is longer than the first cycle.

According to an embodiment, based on a clock generated by the clock module 622, the delay module 623 may delay the first digital signal by a predetermined clock. For example, the clock module 622 may generate a clock having a first cycle, and the delay module 623 may delay the first digital signal by a predetermined clock so as to generate a second digital signal.

For example, the clock module 622 may shift the first digital signal by a predetermined clock in the time domain to generate the second digital signal. That is, delaying performed by the delay module 623 may be referenced as shifting (shift) performed in the time domain.

According to an embodiment, the detector 628 may generate a first control signal for the first converter 626. For example, the detector 628 may identify a change of the magnitude of a voltage of a waveform of the first digital signal, and may generate the first control signal for controlling the first converter 626 based on the change of the magnitude of the voltage. For example, the detector 628 may identify that the voltage value of the first digital value is increased when the voltage value of the first digital signal is changed from a first value (e.g., binary number 010) to a second value (e.g., binary number 011) during a predetermined time. In this case, the detector 628 may generate the first control signal that turns on part of the transistors included in the first converter 626 during a predetermined period.

As another example, the detector 628 may identify that the voltage value of the first digital value is decreased when the voltage value of the first digital signal is changed from a first value (e.g., binary number 010) to a third value (e.g., binary number 001) during a predetermined time. In this case, the detector 628 may generate the first control signal that turns off part of the transistors included in the first converter 626 during a predetermined period.

According to an embodiment, the comparator 624 may generate a second control signal for controlling at least one lumped element 627 (e.g., a variable inductor) based on the first digital signal and the second digital signal. For example, the comparator 624 may subtract the second digital signal from the first digital signal, and may generate, based on a value obtained by the subtraction, a signal that performs control so as to connect or not to connect the at least one lumped element 627 to the first converter 626.

For example, in case that the value obtained by subtracting the second digital signal from the first digital signal is a first value during the first time period, the comparator 624 may generate a signal that performs control so as to connect a first inductor having a first inductance value to the first converter 626. The value that the comparator 624 obtains by subtracting the second digital signal from the first digital signal during a second time period is a second value, and the second value may be greater than the first value. In this instance, the comparator 624 may generate a signal that performs control so as to connect a second inductor having a second inductance value, greater than the first inductance value, to the first converter 626.

According to an embodiment, the synchronization module 625 may synchronize the first control signal and the second control signal based on a clock received from the clock module 622. For example, based on a predetermined clock, the synchronization module 625 may synchronize an operation of the first converter 626 and the point in time at which the at least one lumped element 627 is connected to the first converter 626.

For example, based on the first digital signal, the detector 628 may generate the first control signal that performs control so that transistors of the first converter 626 are turned on in the first time period, and the transistors of the first converter 626 are turned off in the second time period. In an embodiment, it is assumed that the delay module 623 delays the first digital signal by a predetermined clock (e.g., 2 clocks) so as to generate the second digital signal.

In this instance, based on the second digital signal, the comparator 624 may perform control so that the first inductor is connected to the first converter 626 in a first delay time period, and the second inductor is connected to the first converter 626 in a second delay time period.

The first delay time period (delay period) may have a difference of the predetermined clock (e.g., 2 clocks) when compared to the first time period, and the second delay time period may have a difference of the predetermined clock (e.g., 2 clocks) when compared to the second time period. However, the difference of the predetermined clock (e.g., 2 clocks) is made by the delay module 623, and the first delay time period and the first time period may be substantially the same time period. In the same manner, the second delay time period and the second time period may be substantially the same time period.

Therefore, the first SM 620 may need to synchronize the first time period and the first delay time period, which are different by the predetermined clock (e.g., 2 clocks), and the synchronization module 625 may synchronize the first control signal and the second control signal based on the predetermined clock. As another example, based on the predetermined clock, the synchronization module 625 may synchronize an operation (e.g., on/off) of the first converter 626 and the connection of the at least one lumped element 627 to the first converter 626 in the time domain.

According to an embodiment, the first converter 626 may perform DC-DC conversion based on the first control signal. For example, the first converter 626 may control the on/off state of the transistors included in the first converter 626 based on the first control signal, so as to convert a DC current received from the power source 460 into a current having a slope.

A method of converting a DC current into a current having a slope, by the first converter 626, will be described in detail with reference to FIG. 6B.

According to an embodiment, the at least one lumped element 627 may include a plurality of inductors. For example, the plurality of inductors may include a first inductor having a first inductance value (e.g., L), a second inductor having a second inductance value (e.g., 2L) greater than the first inductance value, and a third inductor having a third inductance value (e.g., 3L) greater than the second inductance value.

In this case, the first inductor, the second inductor, and/or the third inductor may be selectively connected to the first converter based on the second control signal. As mentioned later in the description with reference to FIG. 10B, the slope of a current that has a slope may be inversely proportional to an inductance value.

According to an embodiment, the circuit 640 may include a first comparator 641 and a second comparator 642. The circuit 640 may electrically connect the linear SM 610 and the second SM 630. For example, the circuit 640 may transmit or transfer a predetermined current 602, received from the linear SM 610, to the second SM 630.

According to an embodiment, the circuit 640 may compare the magnitude of a voltage of the predetermined current 602 received from the linear SM 610 and a baseline voltage value (Voffset) input into the second comparator 642, and may or may not transmit the predetermined current 602 to the second SM 630. For example, in case that the voltage value of the predetermined current 602 is less than the baseline voltage value, the circuit 640 may not transfer the predetermined current 602 to the second SM 630. For example, in case that the voltage value of the predetermined current 602 is greater than or equal to the baseline voltage value, the circuit 640 may transfer the predetermined current 602 to the second SM 630.

According to an embodiment, the second SM 630 may include a second converter 631 for DC-DC conversion and/or an inductor 632 having a constant inductance value. For example, the second converter 631 (e.g., a buck converter) may have a configuration which is substantially the same as the first converter.

According to an embodiment, the second SM 630 may receive the predetermined current 602 having a predetermined voltage and output from the first SM 620, and may amplify the current value and/or voltage value of the predetermined current 602.

According to an embodiment, the first SM 620 may output a third current 603, and the second SM 630 may output a fourth current 604. In this case, a total current 605 including the third current 603 and the fourth current 604 may be transferred to the PA 440, and a voltage value corresponding to the total current 605 may be applied to the PA 440.

According to an embodiment, the first SM 620 may be connected to a first node 651 of a connection line that connects the linear SM 610 and the circuit 640. The first SM 620 may be connected to a second node 652 of a connection line connecting the second SM 630 and the PA 440. For example, the third current 603 and the fourth current 604 may be put together by the second node 652, and may be transferred to the PA 440.

Although FIG. 6 of the disclosure has described that the quantizer module 621, the clock module 622, the delay module 623, the detector 628, the comparator 624, and the synchronization module 625 constitute a single piece of hardware, this is merely an example. For example, each of the quantizer module 621, the clock module 622, the delay module 623, the detector 628, the comparator 624, and the synchronization module 625 may be a single software module. In this instance, the first SM 620 may be a subject of the operations performed by the quantizer module 621, the clock module 622, the delay module 623, the detector 628, the comparator 624, and the synchronization module 625.

The term "module" used in the disclosure may be replaced with the term "circuit" or "circuitry." For example, the quantizer module 621 may be replaced with the term "quantizer circuit" or "quantizer circuitry."

The term "time period (period)" used in the disclosure may be replaced with the terminology "term," "span," "time zone," "time region," or "time domain."

Figure 6B:
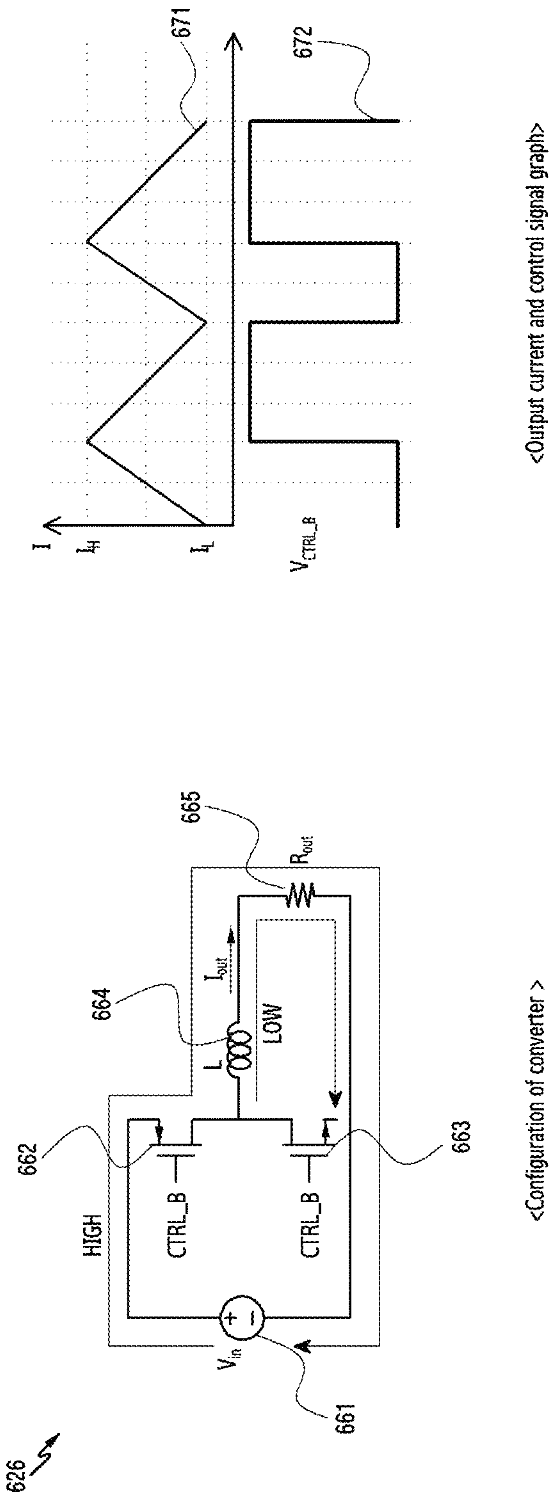
FIG. 6B illustrates a diagram of a first converter or a second converter according to an embodiment of the disclosure.

FIG. 6B illustrates a diagram of a first converter or a second converter according to an embodiment of the disclosure.

Referring to FIG. 6B, the first converter 626 according to an embodiment may include a power source 661, a first transistor 662 (e.g., a high-side switch), a second transistor 663 (e.g., a low-side switch), an inductor 664, and/or a resistor 665.

According to an embodiment, the first transistor 662 and/or the second transistor 663 may be turned on/off based on a second control signal generated from the first SM 620. As the first transistor 662 and/or the second transistor 663 is turned on/off, a relatively high current (e.g., HIGH) may be output or a relatively low current (e.g., LOW) may be output or detected from the resistor 665.

For example, based on the second control signal, the first transistor 662 may operate (e.g., turned on), and the second transistor 663 may not operate (e.g., turned off). In this instance, a relatively high current (e.g., HIGH) output from the power source 661 may be output from the resistor 665. As another example, based on the second control signal, the first transistor 662 may not operate, and the second transistor 663 may not operate. In this instance, a relatively high current (e.g., HIGH) output from the power source 661 may not flow through the resistor 665, and a relatively low current (e.g., LOW) that has been charged in the inductor 664 may be output from the resistor 665.

According to an embodiment, a first graph 671 may be a graph of an output current (Iout) output from the resistor 665, and a second graph 672 may be referenced as a graph of a signal for controlling the second transistor 663 among second control signals. Referring to the first graph 671 and the second graph 672, it is identified that the second graph 672 shows a relatively low voltage value (e.g. LOW) when an output current (Iout) according to an embodiment is increased, and the second graph 672 shows a relatively high voltage value (e.g., HIGH) in case that the output current (Iout) is decreased.

Equation 1 is an equation related to a parameter (r) indicating the slope of an output current (Iout). For example, in Equation 1, $I_H$ denotes a maximum current value, $I_L$ denotes a minimum current value, D denotes a coefficient, $R_{out}$ denotes a resistance value of the resistor 665, L denotes an inductance value of the inductor 664, and $f_{sw}$ denotes a switching cycle.

$$r = \frac{I_H - I_L}{I_{out}} = (1 - D) * R_{out} * \frac{1}{L * f_{sw}} \qquad \text{Equation 1}$$

Referring to Equation 1, it is identified that the slope of an output current (Iout) is identified or determined based on the inductance of the inductor 664 included in the first converter 626. For example, the slope of an output current (Iout) may be based on an inductance value of the inductor 664 included in the first converter 626 or an inductance value of the at least one lumped element 627 (e.g., a variable inductor) connected to the first converter 626.

As another example, the slope of an output current (Iout) may be inversely proportional to an inductance value of the inductor 664 included in the first converter 626 or an inductance value of the at least one lumped element 627 (e.g., a variable inductor) connected to the first converter 626.

Although FIG. 6B in the disclosure has been described based on the first converter 626, this is merely an example. For example, the description of FIG. 6B may also be applicable to the second converter 631.

Figure 7:
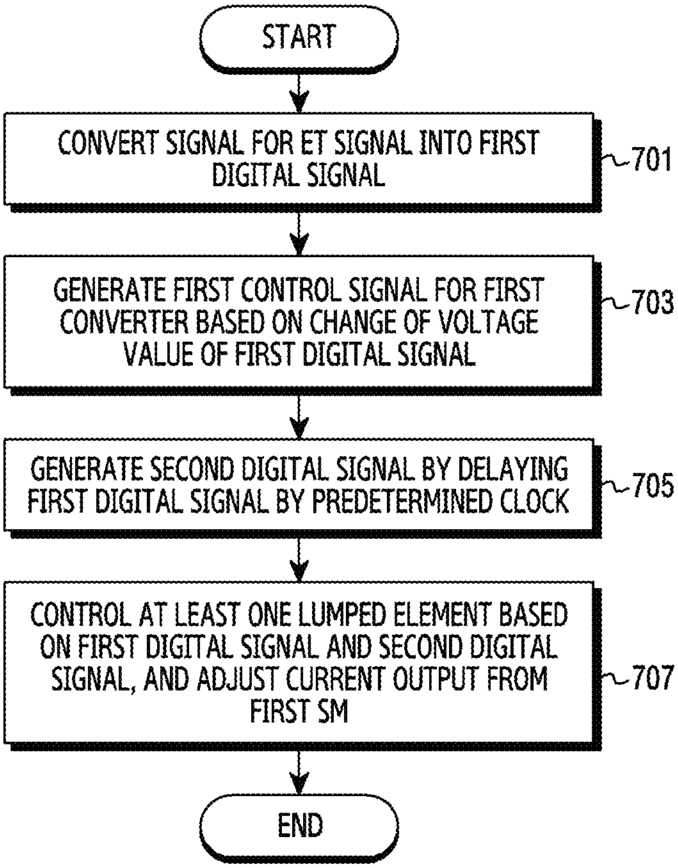
FIG. 7 illustrates a diagram of an operation of a first SM for adjusting a current output from the first SM according to an embodiment of the disclosure.

FIG. 7 illustrates a diagram of an operation of a first SM for adjusting a current output from the first SM according to an embodiment of the disclosure.

Referring to FIG. 7, the first SM 620 according to an embodiment may convert a signal for ET (e.g., the ET signal 463) into a first digital signal in operation 701. For example, the first SM 620 may generate a first digital signal based on an ET signal received from the RFIC 430. For example, the first SM 620 may generate a first digital signal by quantizing the ET signal 463 received from the RFIC 430.

For example, the first SM 620 may divide a voltage waveform of the ET signal 463 into predetermined time periods, and may identify or determine, as a predetermined value (e.g., a binary number), a voltage of the ET signal 463 for each divided time period. For example, the first SM 620 may identify the voltage value of the ET signal 463 in a first time period as a first value (e.g., binary number 111) in case that the voltage waveform of the ET signal 463 in the first time period falls between the first value (e.g., binary number 111) and a second value (e.g., binary number 100).

According to an embodiment, the first SM 620 may generate a first control signal for the first converter 626 based on a change of the voltage value of the first digital signal in operation 703. For example, the first SM 620 may compare a first voltage value in the first time period and a second voltage value in a second time period subsequent to the first time period. The first SM 620 may generate the first control signal that turns on a transistor (e.g., the first transistor 662) included in the first converter 626 when the first voltage value is greater than or equal to the second voltage value. The first SM 620 may generate the first control signal that turns off the transistor (e.g., the first transistor 662) included in the first converter 626 when the first voltage value is less than the second voltage value.

As another example, the first SM 620 may generate the first control signal that performs adjustment so that the first converter 626 outputs a relatively high current (e.g., HIGH) when the first voltage value is greater than or equal to the second voltage value. The first SM 620 may generate the first control signal that performs adjustment so that the first converter 626 outputs a relatively low current (e.g., LOW) when the first voltage value is less than the second voltage value.

According to an embodiment, the first SM 620 may generate a second digital signal by delaying the first digital signal by a predetermined clock. For example, the first SM 620 may generate the second digital signal by shifting the first digital signal by a predetermined clock (e.g., 2 clocks) in the time domain. That is, the second digital signal may be a signal shifted by the predetermined clock (e.g., 2 clocks) when compared to the first digital signal in the time domain.

According to an embodiment, the first SM 620 may be configured to control the at least one lumped element 627 based on the first digital signal and the second digital signal so as to adjust a current output from the first SM 620 in operation 707. For example, the first SM 620 may subtract a voltage value of the second digital signal from a voltage value of the first digital signal. Both the voltage value (e.g., binary number 111) of the first digital signal and the voltage value (e.g., binary number 110) of the second digital signal are identified as binary numbers, and thus the voltage value (e.g., binary number 001) obtained after subtraction may be also represented as a binary number.

According to an embodiment, the first SM 620 may control electric connection between the at least one lumped element 627 and the first converter 626 based on the voltage value (e.g., binary number 001) obtained after subtraction. For example, the at least one lumped element 627 may include a first inductor having a first inductance value (e.g., L) and/or a second inductor having a second inductance value (e.g., 2L). In this case, a difference value between the voltage value (e.g., 000) of the first digital signal and the voltage value (e.g., 011) of the second digital signal may be 011 in the first time period. In the second time period, a difference value between the voltage value (e.g., 100) of the first digital signal and the voltage value (e.g., 000) of the second digital signal may be 100. When the second time period arrives while the first SM 620 connects the first inductor having the first inductance value (e.g., L) to the first converter 626 in the first time period, the first SM 620 may connect the second inductor having the second inductance value (e.g., 2L) to the first converter 626.

According to an embodiment, in case that the first SM 620 controls the electric connection of the at least one lumped element 627 and the first converter 626 based on the second control signal, an inductor connected to the first converter 626 may be changed and an inductance of the first converter 626 may be changed. Accordingly, as described in Equation 1, a slope of an output current (Iout) output from the first converter 626 is based on the inductance of the first converter 626, and thus the slot of the output current (Iout) may be changed depending on at least one lumped element connected to the first converter 626.

For example, a slope of an output current (Iout) of the case where the second inductor having the second inductance value (e.g., 2L) is connected to the first converter 626 may be two times the slope of the case where the first inductor having the first inductance value (e.g., L) is connected to the first converter 626.

In the disclosure, a voltage value of a digital signal may substantially correspond to a bit level. For example, as described later with reference to FIG. 13, the electronic device 301 may determine the number (e.g., N) of bits for displaying (or identifying) the voltage value of the digital signal and the number (e.g., 2^N)) of bit levels corresponding to the number of bits. The voltage value of the digital signal may be displayed (or identified) based on the bit levels. For example, in the case where N=2 and the number of bit levels is 4, the overall bit levels may be 00, 01, 10, and 11. In this instance, the electronic device 301 may display (or identify) the voltage value of the digital signal as "greater than or equal to 00 and less than or equal to 11".

Figure 8:
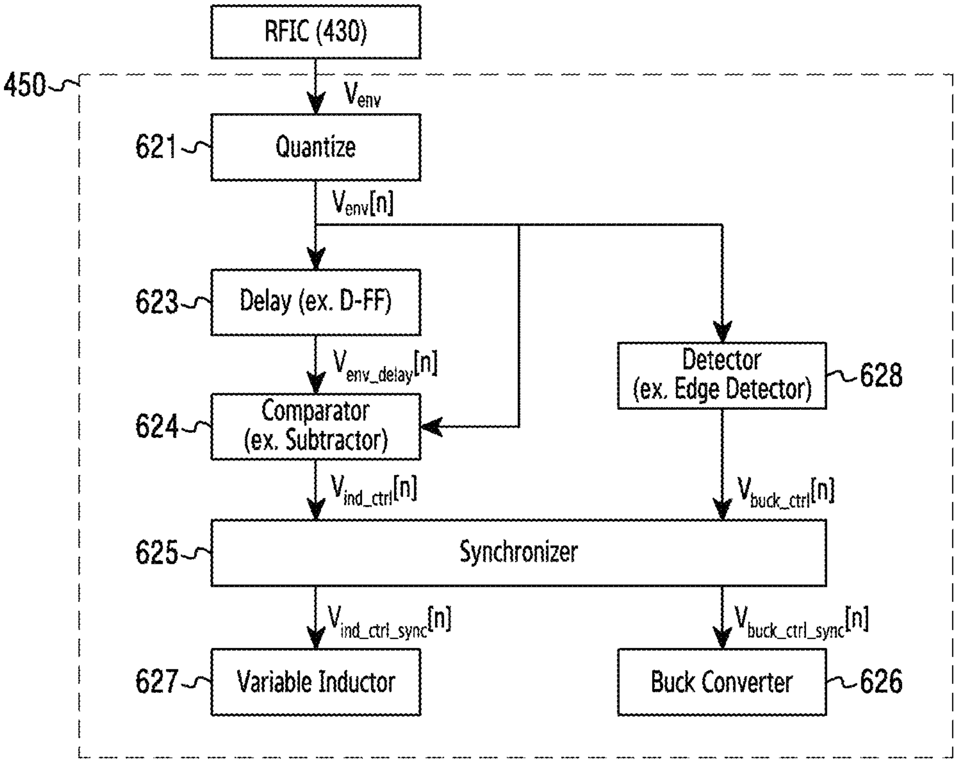
FIG. 8 illustrates a diagram of a first SM controlling a first converter and inductors according to an embodiment of the disclosure.

FIG. 8 illustrates a diagram of a first SM controlling a first converter and inductors according to an embodiment of the disclosure.

Referring to FIG. 8, the quantizer module 621 according to an embodiment may receive a signal for ET (e.g., the ET signal 463) from the RFIC 430. The quantizer module 621 may quantize a voltage of the signal for ET.

For example, the voltage ($V_{env}$) of the signal for ET may be an alternating voltage, and may consecutively vary over time. The quantizer module 621 may divide a voltage waveform of the signal for ET into time periods in the time domain, and may identify a voltage value (e.g., binary number 010) of the signal for ET for each time period. The identified voltage value (e.g., 010) of the signal may be a DC voltage having a constant value within a time period.

According to an embodiment, the quantizer module 621 may quantize the voltage of the signal for ET, and may generate or identify a first digital signal.

According to an embodiment, the delay module 623 may receive the first digital signal from the quantizer module 621. For example, the first digital signal may have a quantized voltage ($V_{enj}[n]$).

According to an embodiment, the delay module 623 (e.g., D-Flip Flop) may delay the first digital signal by a predetermined clock (e.g., 1 clock), so as to generate or identify a second digital signal. For example, the second digital signal may have a voltage ($V_{env\_delay}[n]$). Voltage values of the second digital signal may have time differences of the predetermined clock (e.g., 1 clock) from voltage values of the first digital signal.

According to an embodiment, the comparator 624 may receive the second digital signal from the delay module 623, and may receive the first digital signal from the quantizer module 621. For example, the comparator 624 may identify the voltage ($V_{env\_delay}$[n]) of the second digital signal, and may identify the quantized voltage ($V_{env}$[n]) of the first digital signal.

According to an embodiment, the comparator 624 may subtract the voltage of the second digital signal from the quantized voltage of the first digital signal. For example, the comparator 624 may subtract a voltage waveform of the second digital signal from a voltage waveform of the first digital signal.

According to an embodiment, the comparator 624 may generate a second control signal for controlling the at least one lumped element 627 based on the difference between the quantized voltage of the first digital signal and the voltage of the second digital signal. For example, the electronic device 301 may store a lookup table including a correspondence relationship between a plurality of inductors and differences in voltage between the first digital signal and the second digital signal.

For example, referring to the stored lookup table, a first difference value corresponds to a first inductor having a first inductance value (e.g., L), and a second difference value corresponds to a second inductor having a second inductance value (e.g., 2L). In this instance, when a voltage difference is a first value during a first time period, the comparator 624 may generate the second control signal that activates the first inductor during the first time period. In case that a voltage difference is a second value during a second time period, the comparator 624 may generate the second control signal that activates the second inductor during the second time period.

For example, a voltage of the second control signal may be expressed as $V_{ind\_ctrl}$[n], and the voltage of the second control signal may be different for each time period. In an embodiment, when a voltage that activates the first inductor is HIGH and a voltage that activates the second inductor is LOW, the second control signal may be HIGH in the first time period and may be LOW in the second time period.

According to an embodiment, the detector 628 (e.g., an edge detector) may receive the first digital signal from the quantizer module 621. The detector 628 may generate a first control signal for the first converter 626 based on a voltage of the first digital signal. For example, the detector 628 may generate the first control signal for the first converter 626 based on a change of a voltage waveform of the first digital signal. For example, the detector 628 may generate the first control signal for the first converter 626 based on a change of the voltage waveform of the first digital signal.

For example, it is assumed that a voltage value of the first digital signal is a first value (e.g., 001) during the first time period, the voltage value of the first digital signal is a second value (e.g., 011) during the second time period subsequent to the first time period, and the voltage value of the first digital signal during a third time period subsequent to the second time period is a third value (e.g., 010). In this case, as the time period is changed from the first time period to the second time period, the detector 628 may identify that the voltage value is changed from the first value to the second value which is higher than the first value. Based on the change of the voltage value (e.g., an increase in the voltage value), the detector 628 may generate the first control signal that performs adjustment so that the first converter 626 outputs a relatively high output current (Iout) during the second time period.

As the time period is changed from the second time period to the third time period, the detector 628 may identify that the voltage value is changed from the second value to the third value which is lower than the second value. Based on the change of the voltage value (e.g., a decrease in the voltage value), the detector 628 may generate the first control signal that performs adjustment so that the first converter 626 outputs a relatively low output current (Iout) during the third time period.

For example, a voltage of the first control signal may be expressed as $V_{buck\_ctrl}$[n], and the voltage of the first control signal may be different for each time period. In an embodiment, it is assumed that a voltage that performs adjustment so that the first converter 626 outputs a relatively high output current is HIGH and a voltage that performs adjustment so that the first converter 626 outputs a relatively low output current is LOW. In this instance, the first control signal may be HIGH in the first time period and may be LOW in the second time period.

Although FIG. 8 in the disclosure has described that the detector 628 adjusts the output current of the first converter 626 using the first control signal, this is merely an example. For example, based on a change of a voltage value (e.g., an increase in a voltage value), the detector 628 may generate the first control signal for performing adjustment so as to apply a high voltage (e.g., HIGH) to the first transistor 662 included in the first converter 626 and apply a low voltage (e.g., LOW) to the second transistor 663 during the second time period. For example, based on a change of a voltage value (e.g., a decrease in a voltage value), the detector 628 may generate the first control signal that performs adjustment to apply a low voltage (e.g., LOW) to the first transistor 662 included in the first converter 626 and apply a high voltage (e.g., HIGH) to the second transistor 663 during the third time period.

According to an embodiment, the synchronization module 625 may receive or obtain the first control signal and the second control signal, and may synchronize the first control signal and the second control signal. For example, the synchronization module 625 may synchronize the first control signal and the second control signal in the time domain.

For example, the second control signal is generated based on the second digital signal that is delayed by the comparator 624 by a predetermined clock (e.g., 1 clock), and thus may have a difference from the first control signal in the time domain. The first control signal for controlling an output current of the first converter 626 and the second control signal for controlling the at least one lumped element 627 may need to be substantially identical in the time domain. Accordingly, the synchronization module 625 may need to synchronize the first control signal and the second control signal based on the predetermined clock.

According to an embodiment, the synchronization module 625 may transmit the second control signal synchronized in the time domain to a switch circuit connected to the at least one lumped element 627, and may transmit the first control signal to the first converter 626.

For example, the switch circuit may control the electric connection relationship between the at least one lumped element 627 (e.g., inductors) and the first converter 626 based on the second control. For example, the first converter 626 may output a current having a relatively high value or a current having a relatively low value for each time period based on the first control signal.

Figure 9:
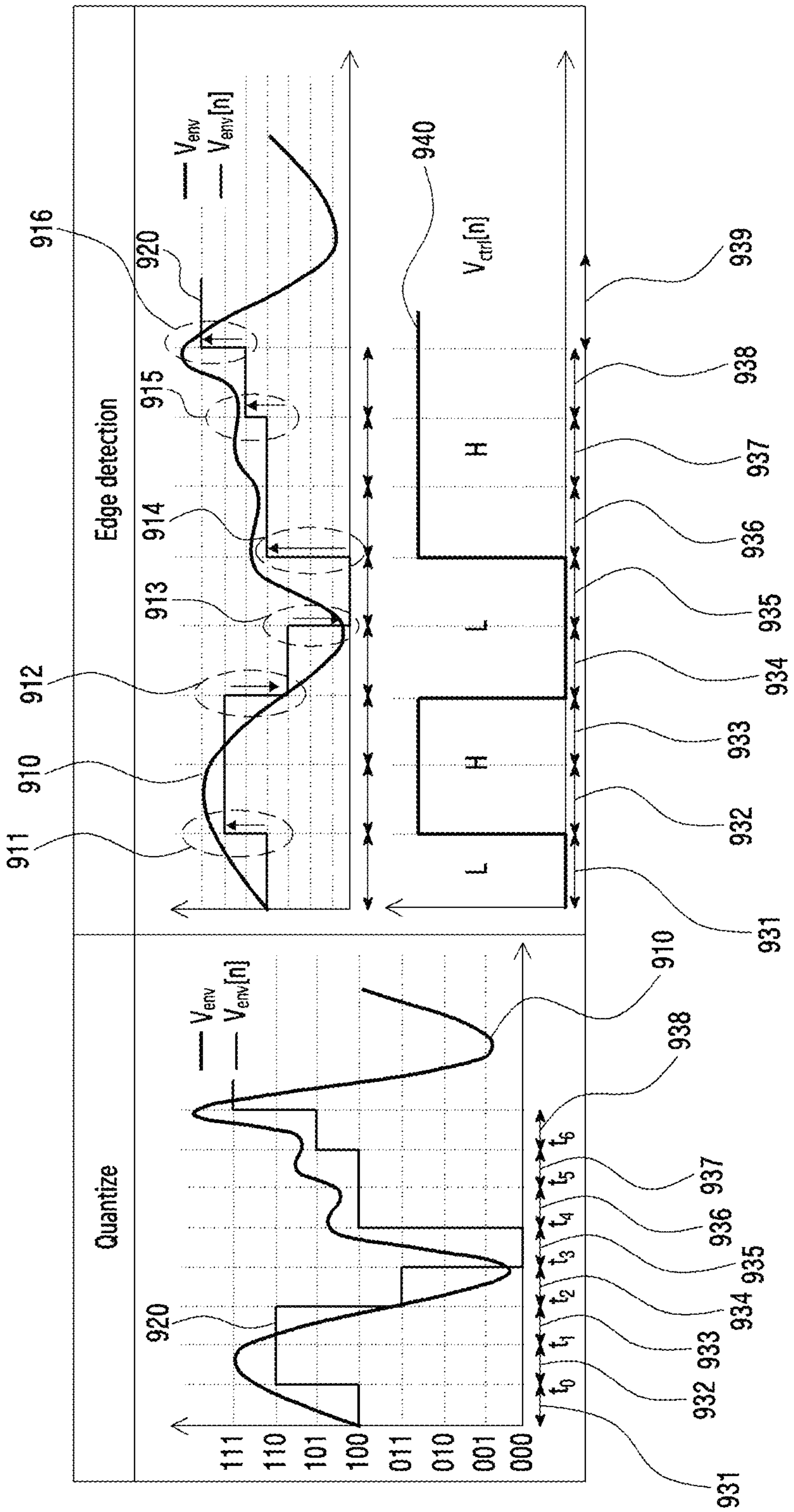
FIG. 9 illustrates a diagram of a first SM quantizing a signal for ET, and generates a first control signal for controlling a first converter based on a change of a voltage of the quantized ET signal, according to an embodiment of the disclosure.

FIG. 9 illustrates a diagram of a first SM that quantizes a signal for ET, and generates a first control signal for controlling a first converter based on a change of a voltage of the quantized ET signal, according to an embodiment of the disclosure.

Referring to FIG. 9, the first SM 620 according to an embodiment may divide a voltage waveform 910 of the ET signal 463 into a plurality of time periods. For example, the first SM 620 may divide the ET signal 463 into a plurality of time intervals in the time domain.

For example, the first SM 620 may divide the voltage waveform 910 of the ET signal 463 based on a first time period 931, a second time period 932, a third time period 933, a fourth time period 934, a fifth time period 935, a sixth time period 936, a seventh time period 937, and/or an eighth time period 938.

In an embodiment, the first time period 931 may be a period of time from an initial timepoint of the voltage waveform to a first timepoint (t0). The second time period 932 may be a period of time from the first timepoint (t0) to a second timepoint (t1). The third time period 933 may be a period of time from the second timepoint (t1) to a third timepoint (t2). The fourth time period 934 may be a period of time from the third timepoint (t2) to a fourth timepoint (t3). The fifth time period 935 may be a period of time from the fourth timepoint (t3) to a fifth timepoint (t4). The sixth time period 936 may be a period of time from the fifth timepoint (t4) to a sixth timepoint (t5). The seventh time period 937 may be a period of time from the sixth timepoint (t5) to a seventh timepoint (t6).

According to an embodiment, the first SM 620 may identify or determine a voltage value corresponding (mapping) to each time period based on the divided voltage waveform 910 for each time period.

According to an embodiment, the first SM 620 may determine or identify a quantized voltage value corresponding to each time period based on a voltage value corresponding to the start point of each time period. For example, the first SM 620 may identify that a voltage value at the start point (e.g., 0) of the voltage waveform 910 during the first time period 931 falls or is distributed between a first value (e.g., 100) and a second value (e.g., 111). In this case, the first SM 620 may determine the first value which is a lower value between the first value (e.g., 100) and the second value (e.g., 111), as a quantized voltage value corresponding to the first time period 931.

For example, the first SM 620 may identify that a voltage value at the start point (e.g., t0) of the voltage waveform 910 during the second time period 932 falls or is distributed between a third value (e.g., 110) and the second value (e.g., 111). In this instance, the first SM 620 may determine the third value (e.g., 110) which is a lower value between the third value (e.g., 110) and the second value (e.g., 111), as a quantized voltage value corresponding to the second time period 932.

For example, the first SM 620 may identify that a voltage value at the start point (e.g., t1) of the voltage waveform 910 during the third time period 933 falls or is distributed between the third value (e.g., 110) and the second value (e.g., 111). In this instance, the first SM 620 may determine the third value (e.g., 110) which is a lower value between the third value (e.g., 110) and the second value (e.g., 111), as a quantized voltage value corresponding to the third time period 933.

For example, the first SM 620 may identify that a voltage value at the start point (e.g., t2) of the voltage waveform 910 during the fourth time period 934 is a fourth value (e.g., 011) or falls between the fourth value (e.g., 011) and the first value (e.g., 100). In this instance, the first SM 620 may determine the fourth value (e.g., 011) as a quantized voltage value corresponding to the fourth time period 934.

For example, the first SM 620 may identify that a voltage value at the start point (e.g., t3) of the voltage waveform 910 during the fifth time period 935 falls between a sixth value (e.g., 001) and a seventh value (e.g., 000). In this case, the first SM 620 may determine the seventh value (e.g., 000) which is a lower value between the sixth value (e.g., 001) and the seventh value (e.g., 000), as a quantized voltage value corresponding to the fifth time period 935.

For example, the first SM 620 may identify that a voltage value at the start point (e.g., t4) of the voltage waveform 910 during the sixth time period 936 falls between the first value (e.g., 100) and an eighth value (e.g., 101). In this case, the first SM 620 may determine the first value (e.g., 100) which is a lower value between the first value (e.g., 100) and the eighth value (e.g., 101), as a quantized voltage value corresponding to the sixth time period 936.

For example, the first SM 620 may identify that a voltage value at the start point (e.g., t5) of the voltage waveform 910 during the seventh time period 937 falls between the first value (e.g., 100) and the eighth value (e.g., 101). In this case, the first SM 620 may determine the first value (e.g., 100) which is a lower value between the first value (e.g., 100) and the eighth value (e.g., 101), as a quantized voltage value corresponding to the seventh time period 937.

For example, the first SM 620 may identify that a voltage value at the start point (e.g., t6) of the voltage waveform 910 during the eighth time period 938 falls between the eighth value (e.g., 101) and the third value (e.g., 110). In this case, the first SM 620 may determine the eighth value (e.g., 101) which is a lower value between the eighth value (e.g., 101) and the third value (e.g., 110), as a quantized voltage value corresponding to the eighth time period 938.

Accordingly, the first SM 620 may quantize the voltage waveform 910 for each time period and may obtain a voltage waveform 920 of a first digital signal.

According to an embodiment, the first SM 620 may generate a first control signal for the first converter 626 based on the first digital signal. For example, the first SM 620 may generate the first control signal based on the voltage waveform 920 of the first digital signal. For example, the first SM 620 may generate the first control signal based on a change of a voltage of the voltage waveform 920 of the first digital signal. For example, the first SM 620 may generate the first control signal based on an edge of the voltage waveform 920 of the first digital signal.

For example, the first SM 620 may compare a voltage value of the first digital signal during the first time period 931 and a voltage value of the first digital signal during the second time period 932. The voltage value during the second time period 932 is greater than the voltage value of the first time period 931, and thus the first SM 620 may identify the voltage (e.g., Vctrl[n]) of the first control signal during the first time period 931 as LOW, and may identify the voltage (e.g., Vctrl[n]) of the first control signal during the second time period 932 as HIGH. That is, based on an increase of the voltage value of the voltage waveform 920 at a first edge 911 of the voltage waveform 920, the first SM 620 may identify the voltage of the first control signal corresponding to the first time period 931 as LOW, and may identify the voltage of the first control signal of the second time period 932 as HIGH.

For example, the voltage value of the first digital signal during the second time period 932 and a voltage value of the first digital signal during the third time period 933 are identical, and thus the first SM 620 may identify the voltage value of the first control signal corresponding to the third time period 933 as HIGH.

For example, the first SM 620 may compare the voltage value of the first digital signal during the third time period 933 and a voltage value of the first digital signal during the fourth time period 934. The voltage value during the fourth time period 934 is lower than the voltage value during the third time period 933, and thus the first SM 620 may identify the voltage of the first control signal corresponding to the third time period 933 as HIGH and may identify the voltage of the first control signal corresponding to the fourth time period 934 as LOW. That is, based on a decrease of the voltage value of the voltage waveform 920 at a second edge 912 of the voltage waveform 920, the first SM 620 may identify the voltage of the first control signal corresponding to the third time period 933 as HIGH, and may identify the voltage of the first control signal of the fourth time period 934 as LOW.

For example, the first SM 620 may compare the voltage value of the first digital signal during the fourth time period 934 and a voltage value of the first digital signal during the fifth time period 935. The voltage value during the fifth time period 935 is lower than the voltage value during the fourth time period 934, and thus the first SM 620 may identify the voltage of the first control signal corresponding to the fifth time period 935 as LOW. That is, based on a decrease of the voltage value of the voltage waveform 920 at a third edge 913 of the voltage waveform 920, the first SM 620 may identify the voltage of the first control signal corresponding to the fifth time period 935 as LOW.

For example, the first SM 620 may compare the voltage value of the first digital signal during the fifth time period 935 and a voltage value of the first digital signal during the sixth time period 936. The voltage value during the sixth time period 936 is higher than the voltage value during the fifth time period 935, and thus the first SM 620 may identify the voltage of the first control signal corresponding to the sixth time period 936 as HIGH. That is, based on an increase of the voltage value of the voltage waveform 920 at a fourth edge 914 of the voltage waveform 920, the first SM 620 may identify the voltage of the first control signal corresponding to the sixth time period 936 as HIGH.

For example, the first SM 620 may compare the voltage value of the first digital signal during the sixth time period 936 and a voltage value of the first digital signal during the seventh time period 937. The voltage value during the sixth time period 936 and the voltage value during the seventh time period 937 are substantially the same, and thus the first SM 620 may identify the voltage value of the first control signal corresponding to the seventh time period 937 as HIGH.

For example, the first SM 620 may compare the voltage value of the first digital signal during the seventh time period 937 and a voltage value of the first digital signal during the eighth time period 938. The voltage value during the eighth time period 938 is higher than the voltage value during the seventh time period 937, and thus the first SM 620 may identify the voltage of the first control signal corresponding to the eighth time period 938 as HIGH. That is, based on an increase of the voltage value of the voltage waveform 920 at a fifth edge 915 of the voltage waveform 920, the first SM 620 may identify the voltage of the first control signal corresponding to the eighth time period 938 as HIGH.

For example, the first SM 620 may compare the voltage value of the first digital signal during the eighth time period 938 and a voltage value of the first digital signal during the ninth time period 939. The voltage value of the first digital signal during the ninth time period 939 is higher than the voltage value during the eighth time period 938, and thus the first SM 620 may identify the voltage of the first control signal corresponding to the ninth time period 939 as HIGH. That is, based on an increase of the voltage value of the voltage waveform 920 at a sixth edge 916 of the voltage waveform 920, the first SM 620 may identify the voltage of the first control signal corresponding to the ninth time period 939 as HIGH.

According to an embodiment, among the voltages of the first control signal, HIGH may be a predetermined first voltage value, and LOW may be a predetermined second voltage value which is lower than HIGH.

According to an embodiment, the first SM 620 may identify the first control signal via the above-described edge detection. For example, the first SM 620 may identify or obtain a voltage waveform 940 of the first control signal via the above-described edge detection.

Figure 10A:
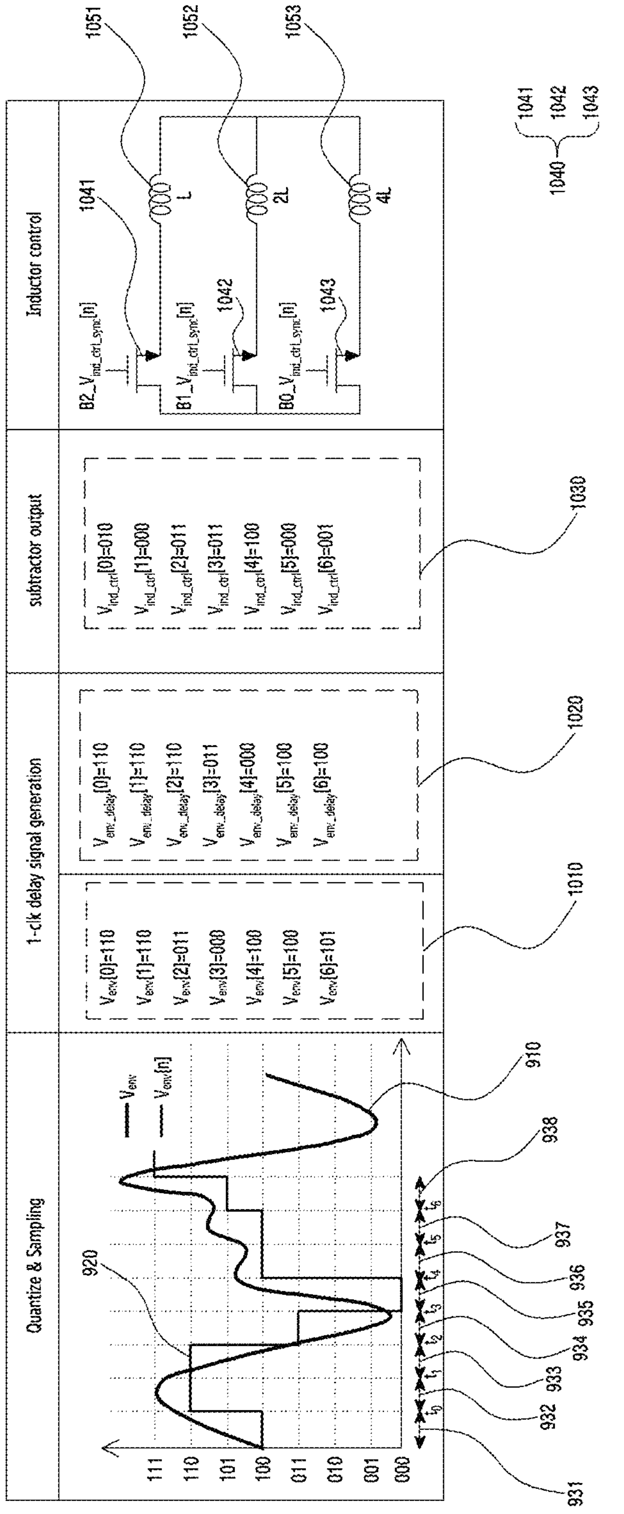
FIG. 10A illustrates a diagram of a first SM that generates a second control signal for at least one lumped element based on a second digital signal according to an embodiment of the disclosure.

FIG. 10A illustrates a diagram of a first SM that generates a second control signal for at least one lumped element based on a second digital signal according to an embodiment of the disclosure.

Referring to FIG. 10A, the first SM 620 according to an embodiment may obtain a first digital signal based on a signal for ET (e.g., the ET signal 463). In FIG. 10A in the disclosure, a method in which the first SM 620 obtains the first digital signal based on the ET signal 463 may be substantially the same as the method that has been described with reference to FIG. 9.

According to an embodiment, the first SM 620 may obtain or identify a second digital signal by delaying the first digital signal by a predetermined clock (e.g., 1 clock). For example, the first SM 620 may identify voltage values 1010 of the first digital signal in time periods. In an embodiment, the voltage value of the first digital signal may be 110 in the second time period 932, may be 110 in the third time period 933, may be 011 in the fourth time period 934, may be 000 in the fifth time period 935, may be 100 in the sixth time period 936, may be 100 in the seventh time period 937, and may be 101 in the eighth time period 938.

In this instance, the first SM 620 may obtain a second digital signal by delaying the first digital signal by 1 clock. A voltage value of the second digital signal may be 100 in the second time period 932, may be 110 in the third time period 933, may be 110 in the fourth time period 934, may be 011 in the fifth time period 935, may be 000 in the sixth time period 936, may be 100 in the seventh time period 937, and may be 100 in the eighth time period 938.

According to an embodiment, the first SM 620 may subtract the second digital signal from the first digital signal. For example, the first SM 620 may subtract the voltage value of the second digital signal from the voltage value of the first digital signal for each time period, and may identify their difference values 1031. For example, the difference value in the second time period 932 may be 010, the difference value in the third time period 933 may be 000, the difference value in the fourth time period 934 may be 011, the difference value in the fifth time period 935 may be 011, the difference value in the sixth time period 936 may be 100, the difference value in the seventh time period 937 may be 000, and the difference value in the eighth time period 938 may be 001.

According to an embodiment, the at least one lumped element 627 may include a first inductor 1051 having a first inductance value (e.g. L), a second inductor 1052 having a second inductance value (e.g., 2L), and/or a third inductor 1053 having a third inductance value (e.g., 4L). Switches 1041 may include a first switch 1041 connected to the first inductor 1051, a second switch 1042 connected to the second inductor 1052, and/or a third switch 1043 connected to the third inductor 1053.

According to an embodiment, the first inductor (L1) may be electrically connected to or disconnected from the first converter 626 via the first switch 1041. For example, based on a second control signal, the first switch 1041 may electrically connect the first inductor 1051 to the first converter 626 or may electrically disconnect the first inductor 1051 from the first converter 626.

According to an embodiment, the second inductor 1052 may be electrically connected to or disconnected from the first converter 626 via the second switch 1042. For example, based on the second control signal, the second switch 1042 may electrically connect the second inductor 1052 to the first converter 626 or may electrically disconnect the second inductor 1052 from the first converter 626.

According to an embodiment, the third inductor 1053 may be electrically connected to or disconnected from the first converter 626 via the third switch 1043. For example, based on the second control signal, the third switch 1043 may electrically connect the third inductor 1053 to the first converter 626 or may electrically disconnect the third inductor 1053 from the first converter 626.

According to an embodiment, the first SM 620 may control electric connection between the at least one lumped element 627 and the first converter 626 based on the difference values. For example, a difference value between the voltages in the second time period 932 may be 010, and the first SM 620 may transmit, to the switches 1041, the second control signal for electrically connecting only the second inductor 1052 to the first converter 626 during the second time period 932.

In this instance, a difference value between the voltages in the third time period 933 may be 000. The difference value between the voltages in the third time period 933 is decreased when compared to the second time period 932, and thus the first SM 620 may connect, to the first converter 626, the third inductor 1053 having the third inductance value (e.g., 4L) higher than the second inductance value (e.g., 2L). Accordingly, the first SM 620 may transmit, to the switches 1041, the second control signal for connecting only the third inductor 1053 to the first converter 626.

As another example, a difference value between the voltages in the fourth time period 934 may be 011. The difference value between the voltages in the fourth time period 934 is increased when compared to the third time period 933, and thus the first SM 620 may connect, to the first converter 626, the first inductor 1051 having the first inductance value (e.g., L) lower than the third inductance value (e.g., 4L). Accordingly, the first SM 620 may transmit, to the switches 1041, the second control signal for connecting only the first inductor 1051 to the first converter 626.

Figure 10B:
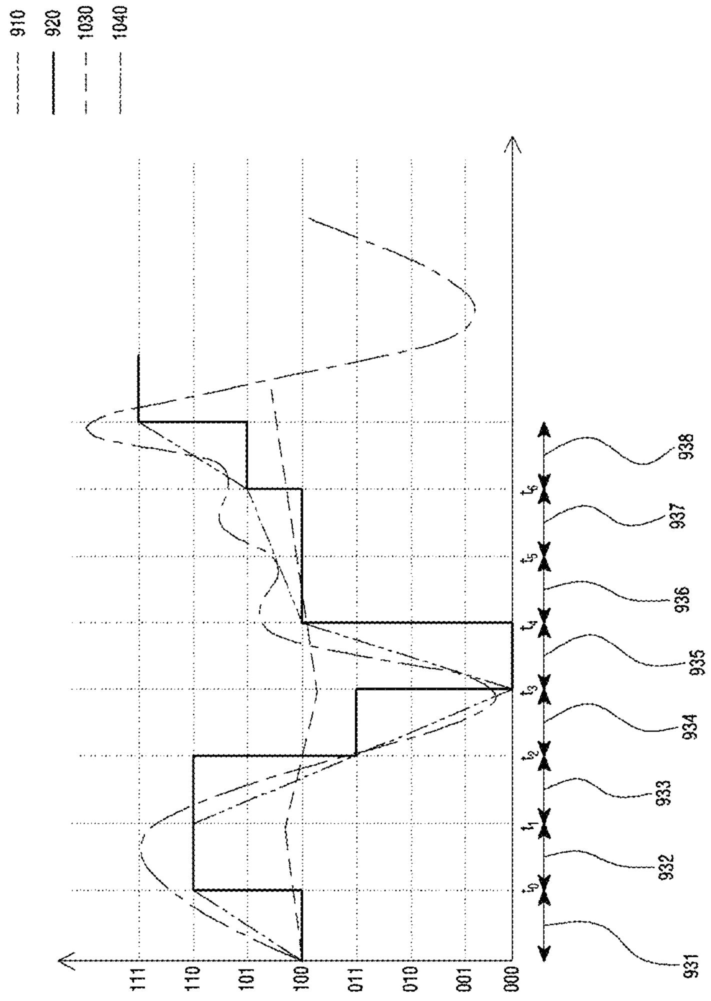
FIG. 10B illustrates a diagram of the comparison of output current values between the case in which at least one lumped element connected to a first converter is changed by a second control signal and the case in which an inductor connected to the first converter is fixed, according to an embodiment of the disclosure.

FIG. 10B illustrates a diagram of the comparison of output current values between the case in which at least one lumped element connected to a first converter is changed by a second control signal and the case in which an inductor connected to the first converter is fixed, according to an embodiment of the disclosure.

Referring to FIG. 10B, the voltage waveform 910 according to an embodiment may be a voltage waveform graph of the ET signal 463. The voltage waveform 920 may be a voltage waveform graph of a first digital signal based on the ET signal 463.

According to an embodiment, a first graph 1030 may be a graph showing a change of an output current value of the first converter 626 over time in the case where an inductor connected to the first converter 626 is fixed. A second graph 1040 may be a graph showing a change of an output current value of the first converter 626 over time in the case where the at least one lumped element 627 connected to the first converter 626 is changed due to a second control signal.

The difference between the first graph 1030 and the voltage waveform 920 of the first digital signal is larger than the difference between the second graph 1040 and the voltage waveform 920 of the first digital signal. For example, at a first timepoint (t0), a voltage difference of approximately 010 may exist between the first graph 1030 and the voltage waveform 920. Conversely, at the first timepoint (t0), a voltage difference of approximately 001 or lower may exist between the second graph 1040 and the voltage waveform 920.

In the case in which a fixed inductor is connected to the first converter 626, the electronic device 301 may need to amplify a current using the linear SM 610 in order to reduce the difference between the first graph 1030 and the voltage waveform 920 of the first digital signal. In this instance, the linear SM 610 may consume a relatively large amount of power than the first SM 620 including the first converter 626. That is, the power efficiency may be decreased when the linear SM 610 is used to amplify a current or voltage.

Conversely, according to an embodiment, when the at least one lumped element 627 (e.g., inductors) is variably connected to the first converter 626, the difference between the second graph 1040 and the voltage waveform 920 of the first digital signal may be relatively small and the electronic device 301 may relatively less dominantly use the linear SM 610. In this case, the electronic device 301 may minimize the current or voltage amplification that uses the linear SM 610, but increase the current or voltage amplification that uses the first SM 620. Accordingly, the electronic device 301 may reduce or minimize power consumption by including the first SM 620 in which the inductors connected to the first converter 626 are variably changed.

Figure 11:
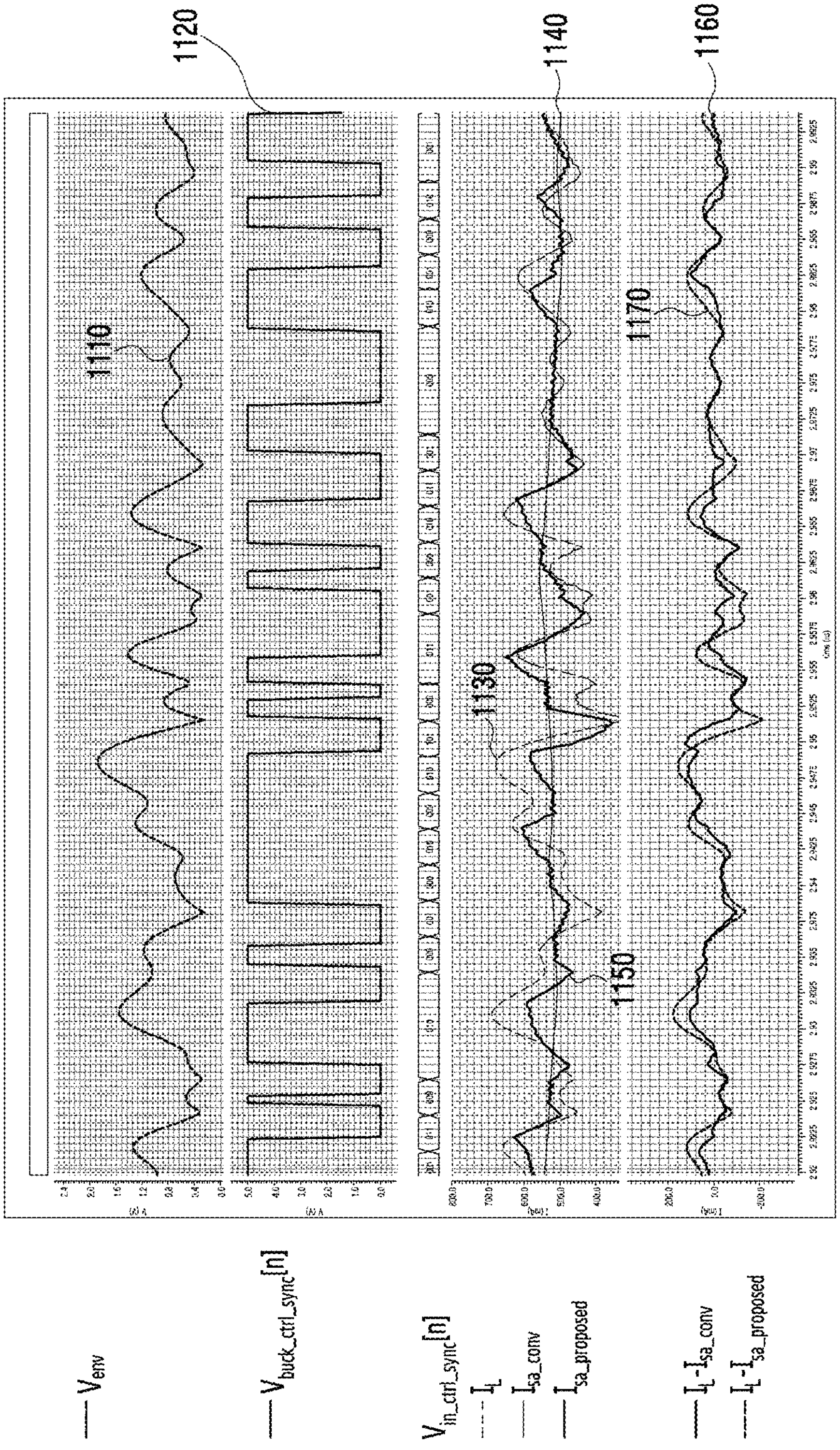
FIG. 11 illustrates a diagram of the comparison of output current values between the case in which an inductor having a constant inductance value is connected to a first converter and the case in which at least one lumped element is variably connected to the first converter, according to an embodiment of the disclosure.

FIG. 11 illustrates a diagram of the comparison of output current values between the case in which an inductor having a constant inductance value is connected to a first converter and the case in which at least one lumped element is variably connected to the first converter, according to an embodiment of the disclosure.

Referring to FIG. 11, a first graph 1110 according to an embodiment may be a graph showing a voltage waveform of the ET signal 463 input into the first SM 620 from the RFIC 430. A second graph 1120 is a graph showing a voltage waveform of a first digital signal generated based on the ET signal 463.

According to an embodiment, a third graph 1130 is a graph showing an output current value output from the SM 450 that includes the linear SM 610 and the first SM 620, over time. A fourth graph 1140 is a graph showing an output current value of a first SM when a fixed inductor is connected to the first converter 626. A fifth graph 1150 is a graph showing an output current value of the first SM 620 when the at least one lumped element 627 is variably connected to the first converter 626, as illustrated in FIG. 6A in the disclosure.

The difference between the third graph 1130 and the fourth graph 1140 is identified as being higher than the difference between the third graph 1130 and the fifth graph 1150. Therefore, in the case in which a fixed inductor is connected to the first converter 626, the linear SM 610 is relatively dominantly utilized when compared to the case in which the at least one lumped element 627 is variably connected to the first converter 626. That is, to offset the difference between the third graph 1130 and the fourth graph 1140, the linear SM 610 may need to be utilized relatively dominantly.

Conversely, in the case in which the at least one lumped element 627 according to an embodiment is variably connected to the first converter 626, the linear SM 610 may be utilized relatively less dominantly, and the first SM 620 may be utilized relatively dominantly. In this instance, the electronic device 301 may reduce or minimize the amount of power consumed by the linear SM 610, thereby efficiently managing power.

According to an embodiment, a sixth graph 1160 is a graph showing the difference between the third graph 1130 and the fourth graph 1140. A seventh graph 1170 is a graph showing the difference between the third graph 1130 and the fifth graph 1150.

That is, the sixth graph 1160 is a graph showing an output current value output from the linear SM 610 when a fixed inductor is connected to the first converter 626, substantially. The seventh graph 1170 is a graph showing an output current value output from the linear SM 610 when the at least one lumped element 627 is variably connected to the first converter 626, substantially.

According to an embodiment, it is identified that the seventh graph 1170 shows values relatively lower than the sixth graph 1160, generally.

Table 1 includes a value obtained by applying a root mean square (rms) to a difference between a current value output from the SM 450 and an output current value output from the linear SM 610 when an inductor having a fixed inductance value is connected to the first converter 626. Table 1 includes a value obtained by applying an rms to a difference between a current value output from the SM 450 and an output current value output from the linear SM 610 when the at least one lumped element 627 is variably connected to the first converter 626.

TABLE 1

| rms($I_L - I_{SA\_conventional}$) | rms($I_L - I_{SA\_proposed}$) |
|---|---|
| 216.9 Ma | 216.9 mA |

Table 2 shows a power efficiency value of the SM 450 in the case (e.g., conventional) in which an inductor having a fixed inductance value is connected to the first converter 626 and a power efficiency value of the SM 450 in the case (present disclosure) in which the at least one lumped element 627 is variably connected to the first converter 626.

TABLE 2

| | Conventional | Present disclosure |
|---|---|---|
| PSA ① | 1739 mW | 1827 mW |
| PLA ② | 612.8 mW | 283.2 mW |
| Supply from SA ③ | 1676 mW | 1730 mW |
| Supply from LA ④ | 62.0 mW | 19.1 mW |
| SA efficiency ⑤ = ③/① | 96.4% | 94.7% |
| LA efficiency ⑥ = ④/② | 10.1% | 6.7% |
| SM efficiency ⑦ = (③ + ④/(① + ②)) | 73.9% | 82.9% |

Referring to Table 1 and Table 2 according to an embodiment, in the case in which the at least one lumped element 627 is variably connected to the first converter 626, it is identified that the SM 450 may secure an increase of approximately 9% in power efficiency, when compared to the case in which an inductor is connected to the first converter 626.

Therefore, the electronic device 301 may perform adjustment based on a second control signal so that the at least one lumped element 627 is selectively connected to the first converter 626, and thus may minimize or reduce the amount of power consumed by the linear SM 610 and may efficiently manage power consumption of the SM 450.

Figure 12:
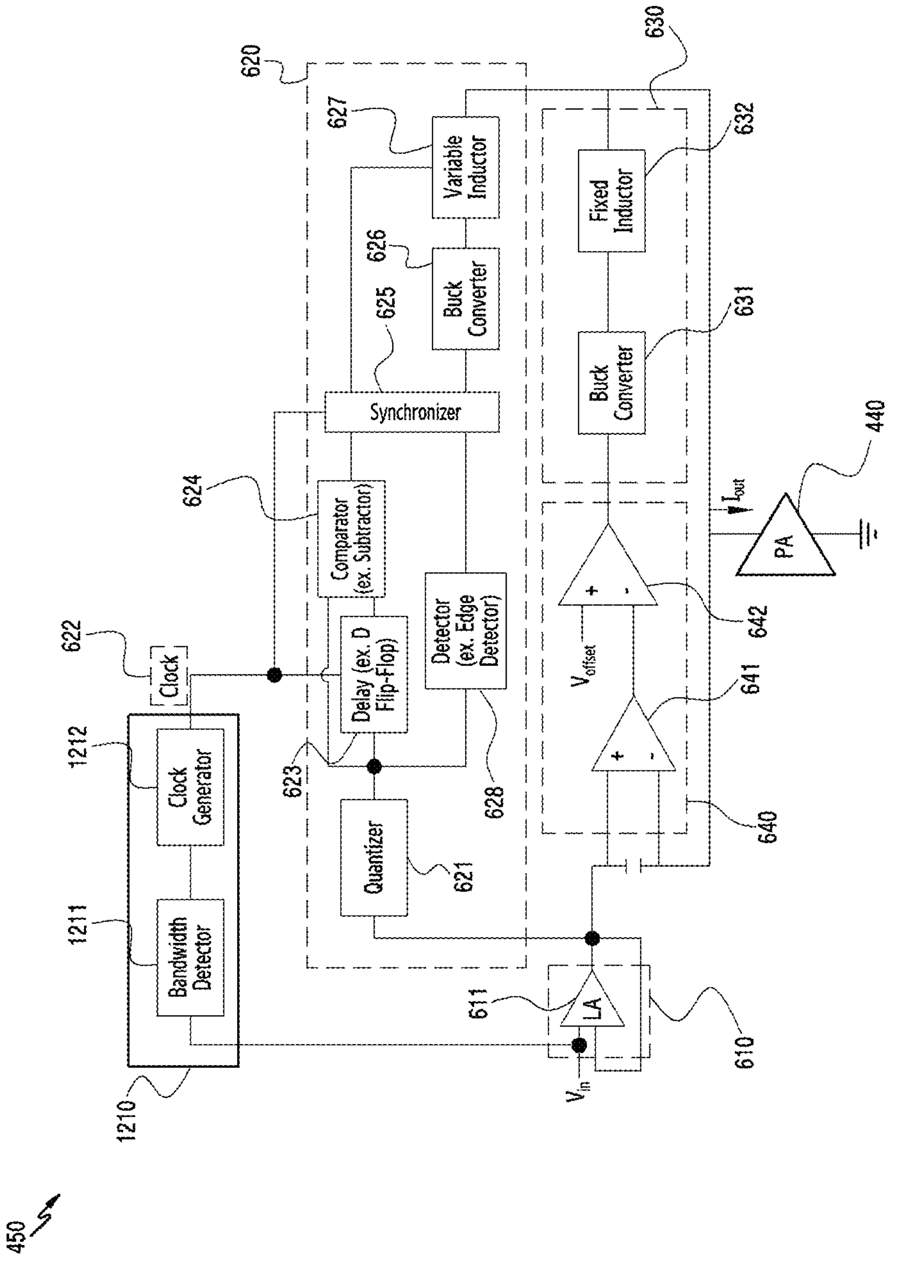
FIG. 12 illustrates a diagram of an SM determining the cycle of a clock based on a bandwidth according to an embodiment of the disclosure.

FIG. 12 illustrates a diagram of an SM determining the cycle of a clock based on a bandwidth according to an embodiment of the disclosure.

Referring to FIG. 12, the SM 450 according to an embodiment may include a bandwidth detector 1211 and/or a clock generator 1212. For example, the SM 450 may include a circuit 1210 for generating a clock, and the circuit 1210 may include the bandwidth detector 1211 and the clock generator 1212.

According to an embodiment, the bandwidth detector 1211 and/or clock generator 1212 may be connected to the first SM 620, may generate a clock for the first SM 620, or may control the cycle or speed of the generated clock.

According to an embodiment, the bandwidth detector 1211 may receive the ET signal 463 from the RFIC 430, and may identify a frequency and/or bandwidth of the ET signal 463. For example, the bandwidth detector 1211 may identify the frequency, bandwidth, and/or cycle of the ET signal 463.

According to an embodiment, the clock generator 1212 may determine a cycle of a clock (or a speed of a clock) based on the identified frequency, bandwidth, and/or cycle. For example, the clock generator 1212 may determine the cycle of the clock as a first cycle when the frequency of the ET signal 463 is greater than or equal to a first threshold value. The clock generator 1212 may determine or identify the cycle of the clock as a second cycle which is longer than the first cycle when the frequency of the ET signal 463 is less than the first threshold value. In this instance, the speed of the clock for the second cycle may be slower than the first cycle. As another example, the clock generator 1212 may determine the speed of the clock as a first speed when the frequency of the ET signal 463 is greater than or equal to the first threshold value. The clock generator 1212 may determine or identify the speed of the clock as a second speed which is lower than the first speed when the frequency of the ET signal 463 is less than the first threshold value. As another example, the clock generator 1212 may determine the speed of the clock to be inversely proportional to the bandwidth.

According to an embodiment, the electronic device 301 may increase power efficiency by variably changing the speed of the clock. For example, in the case in which the speed of the clock is increased (or the cycle is decreased), the amount of power consumed by the SM 450 may be increased. In the case in which the speed of the clock is increased, as a time interval used when the first SM 620 quantizes a voltage waveform of the ET signal 463 is decreased, the similarity between a voltage waveform of a first digital signal and the voltage waveform of the ET signal 463 is increased and the accuracy of the quantized voltage waveform may be increased.

Accordingly, in relation with the speed of the clock, power consumption and the accuracy of the voltage waveform of the first digital signal are in a trade-off relationship. The electronic device 301 may decrease the speed of the clock relatively low in order to minimize power consumption when the power consumption is considered relatively important (e.g., when a battery is lower than or equal to a threshold value). In case that the accuracy of the voltage waveform is considered relatively important, the electronic device 301 may increase the speed of the clock relatively high although the power consumption is increased.

Although FIG. 12 of the disclosure has described the bandwidth detector 1211 and the clock generator 1212 as separate configurations, this is merely an example. For example, the bandwidth detector 1211 and the clock generator 1212 may be configured as software modules, such as the quantizer module 621, instead of hardware configurations. In this instance, the operation of the bandwidth detector 1211 and the clock generator 1212 may be referenced substantially as an operation performed by the SM 450 or the first SM 620. For example, the SM 450 may identify the bandwidth of the ET signal 463 and may determine the speed of a predetermined clock based on the bandwidth. As another example, the first SM 620 may identify the bandwidth of the ET signal 463 and may determine the speed of a predetermined clock based on the bandwidth.

Figure 13:
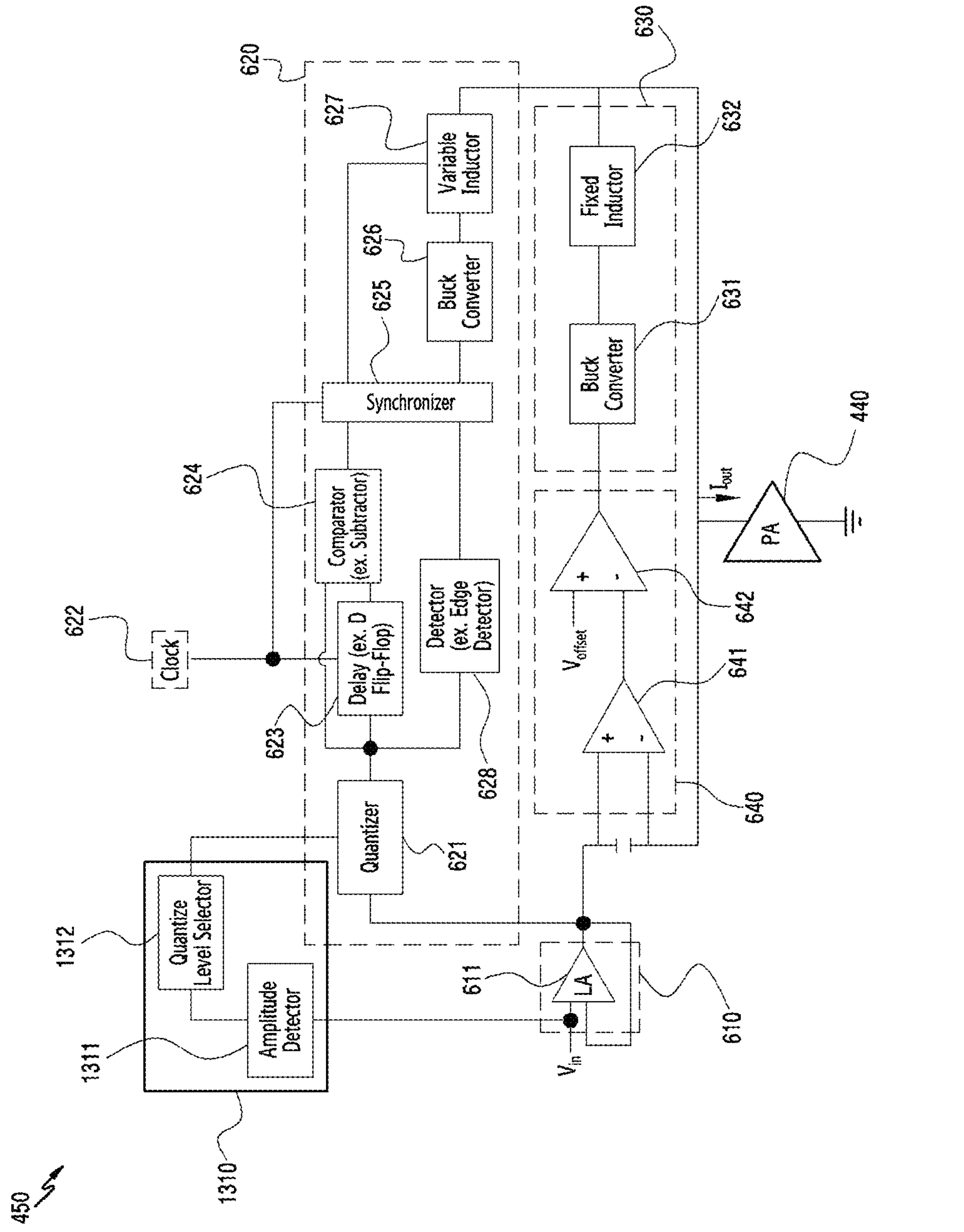
FIG. 13 illustrates a diagram of an SM including an amplitude detector and a quantizer level selector according to an embodiment of the disclosure.

FIG. 13 illustrates a diagram of an SM including an amplitude detector and a quantizer level selector according to an embodiment of the disclosure.

Referring to FIG. 13, the SM 450 according to an embodiment may include an amplitude detector 1311 and/or a quantizer level selector 1312. For example, the SM 450 may include a circuit 1310 for selecting a quantizer level, and the circuit 1310 may include the amplitude detector 1311 and the quantizer level selector 1312.

According to an embodiment, the amplitude detector 1311 and/or quantizer level selector 1312 may be connected to the first SM 620.

A voltage waveform of the ET signal 463 may be represented in a time domain (e.g., the horizontal axis) and a voltage domain (e.g., the vertical axis). In this instance, a unit of the time domain may be a second, a minute, or an hour, and a unit of the voltage domain may be a voltage value expressed as a binary number. When the voltage waveform of the ET signal 463 is represented in the voltage domain (e.g., the vertical axis), it may be expressed using various intervals. For example, voltage values of the voltage waveform of the ET signal 463 may be represented using a total of 4 bit levels such as 00, 01, 10, and 11. That is, the voltage waveform of the ET signal 463 may have voltage values falling between 00 and 11. In this instance, a first digital signal based on the ET signal 463 may also be represented using a total of 4 bit levels. As another example, it may be represented using a total of eight bit levels such as 000, 001, 010, 011, 100, 101, 110, and 111, although the same ET signal 463 is used. That is, the voltage waveform of the ET signal 463 may have voltage values falling between 000 and 111. In this instance, the first digital signal based on the ET signal 463 may also be represented using a total of 8 bit levels.

In an embodiment, the similarity between a quantized voltage waveform of the first digital signal and the voltage waveform of the ET signal 463 may be high when a relatively large number of bit levels (e.g., a total of 8 bit levels) is used for representation.

Hereinafter, a method in which, based on an amplitude of the voltage waveform of the ET signal 463, the amplitude detector 1311 and/or the quantizer level selector 1312 determine the number of bit levels for a voltage waveform, will be described.

According to an embodiment, the amplitude detector 1311 may identify the amplitude of the ET signal 463 received from the RFIC 430, and the quantizer level selector 1312 may determine bit levels used for quantizing the voltage waveform of the ET signal 463 based on the identified amplitude. For example, the amplitude of the ET signal 463 may be referenced as a difference between the maximum voltage value and the minimum voltage of the voltage waveform of the ET signal 463.

According to an embodiment, the quantizer level selector 1312 may determine the number of bit levels used for quantization to be proportional to a magnitude of the amplitude of the voltage waveform of the ET signal 463. For example, the quantizer level selector 1312 may determine a total of 16 bit levels for the voltage waveform of the ET signal 463 such as 0000, 0001, 0010, 0011, 0100, 0101, 0110, 0111, 1000, 1001, 1010, 1011, 1100, 1101, 1110, and 1111 when the magnitude of the amplitude of the voltage waveform of the ET signal 463 is 2. As another example, the quantizer level selector 1312 may determine a total of 8 bit levels for the voltage waveform of the ET signal 463 such as 000, 001, 010, 011, 100, 101, 110, and 111 when the magnitude of the amplitude of the voltage waveform of the ET signal 463 is 1.

According to an embodiment, the operation of determining, by the quantizer level selector 1312, the number of bit levels to be proportional to the magnitude of the amplitude may be referenced substantially as an operation of determining an interval for quantizing consecutive voltage values of the ET signal 463 into a predetermined value based on the difference between the maximum voltage value and the minimum voltage of the ET signal 463. For example, when 16 bit levels are used, the voltage waveform of the ET signal 463 and the voltage waveform of the first digital signal may be represented using relatively narrower intervals than the case where 8 bit levels are used.

Although FIG. 13 of the disclosure has described the amplitude detector 1311 and the quantizer level selector 1312 as separate configurations, this is merely an example. For example, the amplitude detector 1311 and the quantizer level selector 1312 may be configured as software modules, such as the quantizer module 621, instead of hardware configurations. In this instance, the operation of the amplitude detector 1311 and the quantizer level selector 1312 may be referenced substantially as an operation performed by the SM 450 or the first SM 620. For example, the SM 450 may identify the maximum voltage value and the minimum voltage value of the ET signal 463, and may determine an interval for quantizing consecutive voltage values of the signal into a predetermined value based on the difference between the maximum voltage value and the minimum voltage of the ET signal 463.

The magnitude of the amplitude of the voltage waveform of the ET signal 463 and the number of bit levels described in FIG. 13 of the disclosure are merely an example, and the disclosure is not limited thereto.

Hereinafter, a method in which the quantizer level selector 1312 identifies the number of bit levels corresponding to a magnitude of an amplitude of a voltage waveform will be described with reference to FIG. 14.

Figure 14:
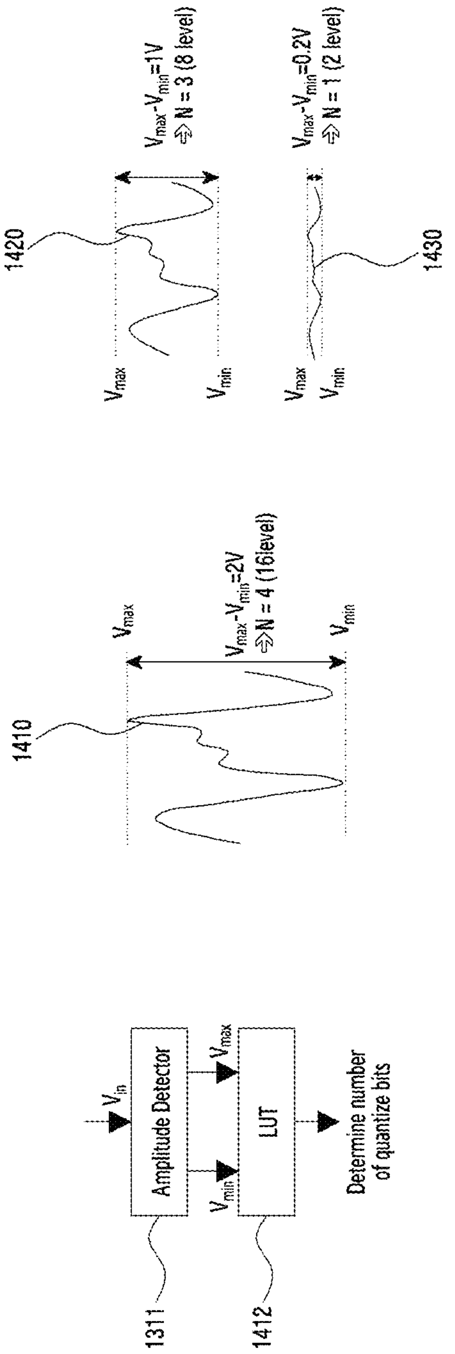
FIG. 14 illustrates a diagram of an amplitude detector that determines the number of bit levels according to an embodiment of the disclosure.

FIG. 14 illustrates a diagram of an amplitude detector that determines the number of bit levels according to an embodiment of the disclosure.

Referring to FIG. 14, the amplitude detector 1311 according to an embodiment may receive the ET signal 463 from the RFIC 430, and may identify a voltage waveform of the received ET signal 463. For example, the amplitude detector 1311 may identify voltage values (Vin) of the ET signal 463.

According to an embodiment, the amplitude detector 1311 may identify the maximum voltage value (e.g., Vmax) and the minimum voltage value (e.g., Vmin) of the voltage waveform of the received ET signal 463, and may determine (or, identify) the number of bit levels based on the identified maximum value and minimum value of the voltage waveform.

According to an embodiment, a look up table (LUT) 1412 may be stored in a memory of the electronic device 301. For example, the LUT 1412 may include the number of bits (e.g., the number of quantization bits) mapped to the maximum voltage value and the minimum voltage value of the ET signal 463. For example, the LUT 1412 may include the number of bit levels mapped to the difference between the maximum voltage value and the minimum voltage value.

For example, the difference between the maximum voltage value and the minimum voltage value of a first voltage waveform 1410 may be a first difference value (e.g., 2V). In the LUT 1412, the case in which the difference between the maximum voltage value and the minimum voltage value is the first difference (e.g., 2V) may be mapped to the case in which the number of bits (e.g., the number of quantization bits) is 4. In this instance, the number of bit levels may be 2^4=16. For example, the bit levels may include 0000, 0001, 0010, 0011, 0100, 0101, 0110, 0111, 1000, 1001, 1010, 1011, 1100, 1101, 1110, and 1111.

For example, the difference between the maximum voltage value and the minimum voltage value of a second voltage waveform 1420 may be a second difference value (e.g., 1V). In the LUT 1412, the case in which the difference between the maximum voltage value and the minimum voltage value is the second difference (e.g., 1V) may be mapped to the case in which the number of bits (e.g., the number of quantization bits) is 3. In this instance, the number of bit levels may be 2^3=8. For example, the bit levels may be 000, 001, 010, 011, 100, 101, 110, and 111.

For example, the difference between the maximum voltage value and the minimum voltage value of a third voltage waveform 1430 may be a third difference value (e.g., 0.2V). In the LUT 1412, the case in which the difference between the maximum voltage value and the minimum voltage value is the third difference (e.g., 0.2V) may be mapped to the case in which the number of bits (e.g., the number of quantization bits) is 1. In this instance, the number of bit levels may be 2^1=2. For example, the bit levels may include 0 and 1.

According to an embodiment, the amplitude detector 1311 may identify the maximum voltage value and the minimum voltage value of the voltage waveform of the ET signal 463, and may determine the number of quantization bits (e.g., N=4) mapped to the difference between the maximum voltage value and the minimum voltage value by using the LUT 1412. Based on the determined number of quantization bits (e.g., N=4), the amplitude detector 1311 may determine the number (e.g., 16) of bit levels for quantization.

Figure 15:
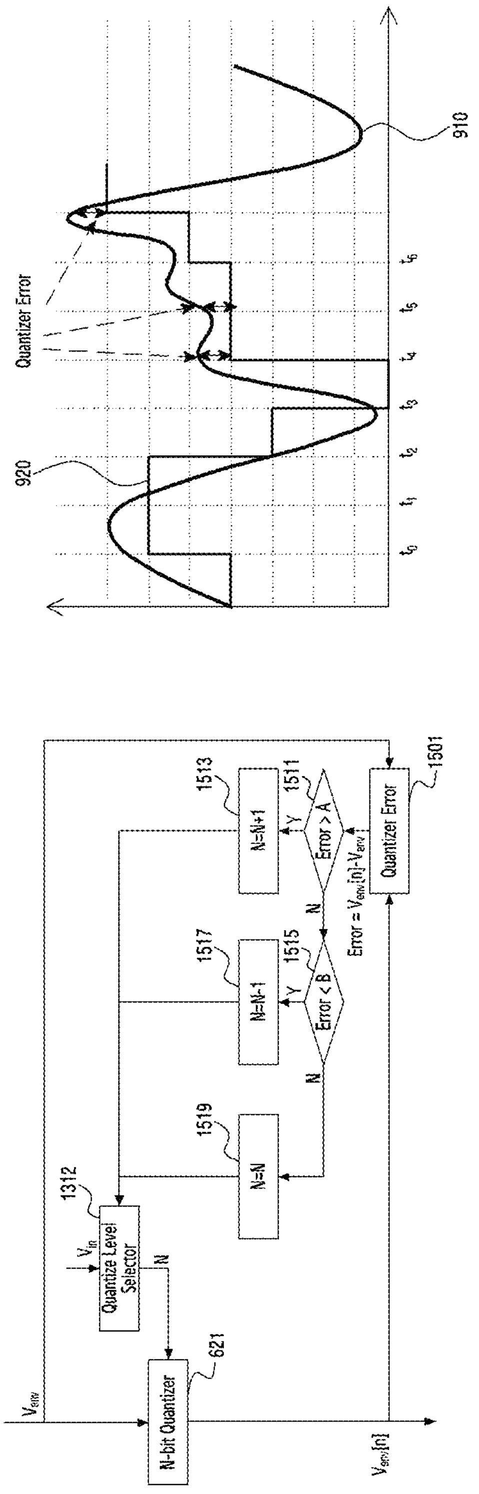
FIG. 15 illustrates a diagram of a method of adjusting the number of bit levels for quantization, by a quantizer error module according to an embodiment of the disclosure.

FIG. 15 illustrates a diagram of a method of adjusting the number of bit levels for quantization, by a quantizer error module according to an embodiment of the disclosure.

Referring to FIG. 15, the SM 450 according to an embodiment may include the quantizer level selector 1312, and the quantizer level selector 1312 may identify voltage values (Vin) of the ET signal 463 received from the RFIC 430.

According to an embodiment, the quantizer level selector 1312 may identify the maximum voltage value (e.g., Vmax) and the minimum voltage value (e.g., Vmin) of a voltage waveform of the received ET signal 463, and may determine (or, identify) the number of bit levels based on the identified maximum value and minimum value of the voltage waveform.

According to an embodiment, when the difference between the maximum value and the minimum value of the voltage waveform is a first difference value (e.g., 2V), the quantizer level selector 1312 may identify the number of bits (e.g., N=4) for quantization corresponding to the first difference value (e.g., 2V). For example, the number of bit levels for quantization may be identified as 2^(the number of bits for quantization).

According to an embodiment, the quantizer level selector 1312 may transfer or transmit information associated with the identified number of bit levels (e.g., 2^4) to the quantizer module 621. The quantizer module 621 may identify the voltage waveform of the ET signal 463 received from the RFIC 430 based on the identified number of the bit levels (e.g., 2^4).

For example, a voltage waveform of a first digital signal based on the ET signal 463 may be represented in a time domain (e.g., the horizontal axis) and a voltage domain (e.g., the vertical axis), and the quantizer module 621 may determine intervals of the voltage domain (e.g., the vertical axis) based on the identified number of bit levels. In this instance, the quantizer module 621 may divide the voltage domain into a total of 16 bit levels, and may identify the voltage waveform of the first digital signal using the 16 bit levels. For example, the voltage waveform of the first digital signal based on the ET signal 463 may be smaller than 1111 that is the highest bit level among the 16 bit levels. As another example, the voltage waveform of the first digital signal based on the ET signal 463 may be shown between 1111 that is the highest bit level and 0000 that is the lowest bit level among the 16 bit levels.

According to an embodiment, the SM 450 may include a quantizer error module 1501.

According to an embodiment, the quantizer error module 1501 may identify the voltage waveform of the first digital signal, and may identify a difference between the voltage waveform of the ET signal 463 and the voltage waveform of the first digital signal.

According to an embodiment, the quantizer error module 1501 may change the number of bits for quantization by comparing threshold values with the difference value (e.g., an error value) between the voltage waveform of the ET Signal 463 and the voltage waveform of the digital signal.

For example, the quantizer error module 1501 may compare the difference value (e.g., an error value) between the voltage waves with a first threshold value (e.g., A), and may perform control so as to increase the number of bits for quantization when the difference value is greater than the first threshold value. In this instance, the quantizer error module 1501 may increase the number of bits for quantization from N (e.g., 4) to N+1 (e.g., 5) in operation 1513.

For example, when the difference value (e.g., the error value) between the voltage waveforms is less than or equal to the first threshold value, the quantizer error module 1501 may determine whether the difference value (e.g., the error value) is less than a second threshold value (e.g., B). In case that the difference value (e.g., the error value) is less than the second threshold value (e.g., B), control may be performed so that the number of bits for quantization is decreased. In this instance, the quantizer error module 1501 may decrease the number of bits for quantization from N (e.g., 4) to N−1 (e.g., 3) in operation 1517.

For example, when the difference value (e.g., the error value) between the voltage waveforms is less than or equal to the first threshold value (e.g., A), and is greater than or equal to the second threshold value (e.g., B), the quantizer error module 1501 may maintain the number of bits for quantization. In this instance, the quantizer error module 1501 may maintain the number of bits for quantization as N (e.g., 4) in operation 1519.

According to an embodiment, the quantizer error module 1501 may transfer information associated with the number of bits (e.g., N−1, N+1) which has been decreased or increased, to the quantizer level selector 1312. As another example, the quantizer error module 1501 may transfer information associated with the number of bits (e.g., N) that has not been changed, to the quantizer level selector 1312.

In the disclosure, it has been described that the quantizer error module 1501 transfers the information associated with the number of bits to the quantizer level selector 1312 in both when the number of bits is changed and when a change is not made, but this is merely an example. For example, the quantizer error module 1501 may transfer the information associated with the number of bits to the quantizer level selector 1312 only in the case where the number of bits is changed (e.g., N−1, N+1).

According to an embodiment, the quantizer level selector 1312 that receives the information associated with the number of bits may determine or identify the number of bit levels for quantization based on the received information associated with the number of bits.

According to an embodiment, as the quantizer error module 1501 variably change the number of bits for quantization, the accuracy of the first digital signal generated by the first SM 620 may be increased or power consumption may be minimized. For example, in the case in which the quantizer error module 1501 relatively increases the number of bits for quantization since an error value is greater than the first threshold value (e.g., A), the intervals of the voltage domain where the voltage waveform is represented become relatively narrower and the voltage waveform of the first digital signal may show relatively high similarity to the voltage waveform of the ET signal 463.

As another example, in the case in which the error value is less than a second threshold value (e.g., B), the voltage waveform of the first digital signal and the voltage waveform of the ET signal 463 may have sufficiently high similarity. Accordingly, the quantizer error module 1501 may reduce bits for quantization, and may relatively reduce power consumption by the first SM 620.

Although FIG. 15 of the disclosure has described the quantizer level selector 1312 and the quantizer error module 1501 as separate configurations, this is merely an example. For example, the quantizer level selector 1312 and the quantizer error module 1501 may be configured as software modules, such as the quantizer module 621, instead of hardware configurations. In this instance, the operation of the quantizer level selector 1312 and the quantizer error module 1501 may be referenced substantially as an operation performed by the SM 450 or the first SM 620.

Figure 16:
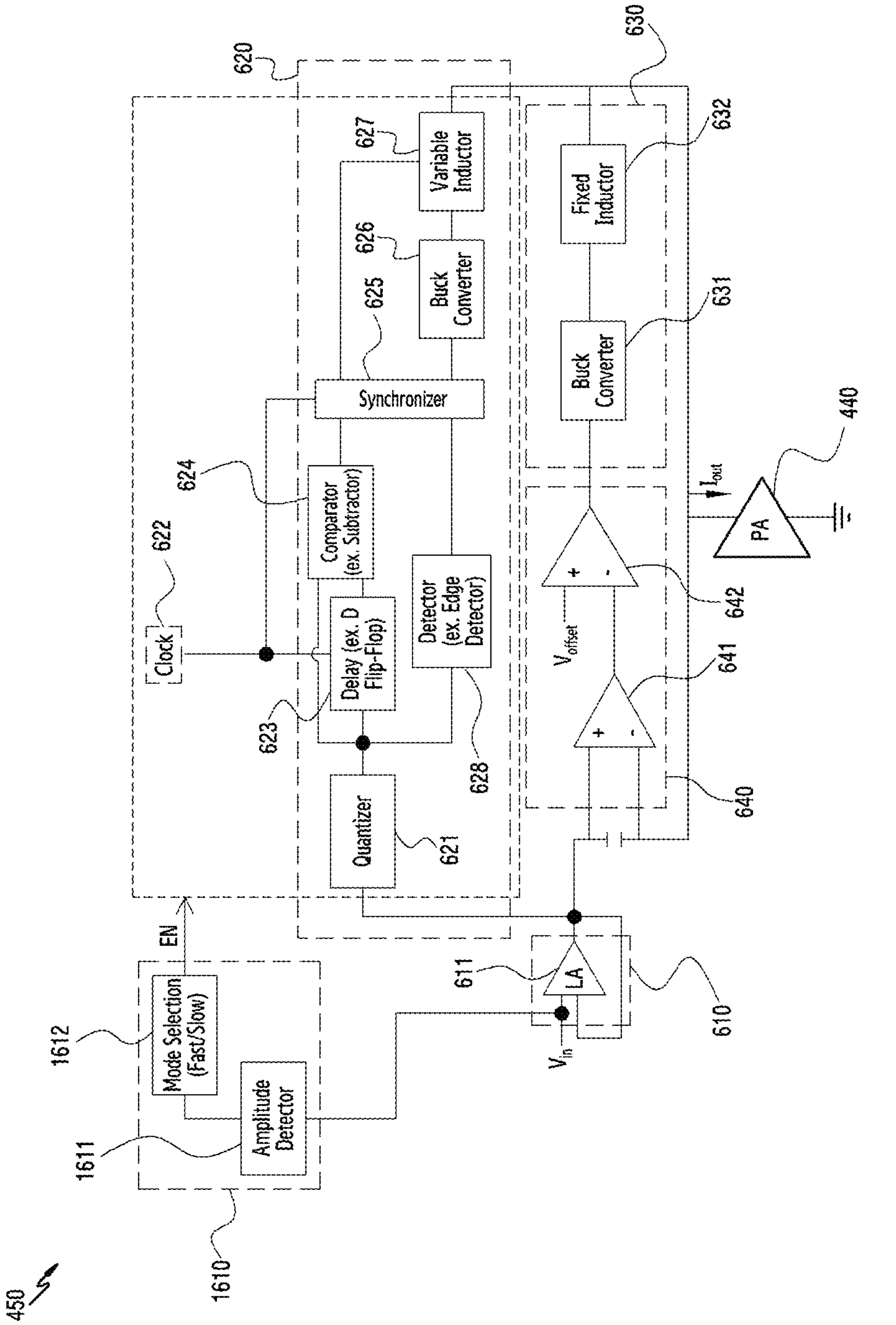
FIG. 16 illustrates a diagram of an SM including a mode selection module according to an embodiment of the disclosure.

FIG. 16 illustrates a diagram of an SM including a mode selection module according to an embodiment of the disclosure.

Referring to FIG. 16, the SM 450 according to an embodiment may include an amplitude detector 1611 and/or a mode selection module 1612. The amplitude detector 1611 of FIG. 16 may correspond to the amplitude detector 1311 of FIG. 13. For example, the SM 450 may include a circuit 1610 for mode selection, and the circuit 1610 may include the amplitude detector 1611 and/or the mode selection module 1612.

According to an embodiment, the mode selection module 1612 may receive information associated with an amplitude of the ET signal 463 from the amplitude detector 1611. For example, the information associated with the amplitude may include information associated with the maximum voltage value, minimum voltage value, and/or average voltage value of a voltage waveform of the ET signal 463. For example, the information associated with the amplitude may include information associated with a time period-based voltage value of the voltage waveform of the ET signal 463.

According to an embodiment, based on the information associated with the amplitude, the mode selection module 1612 may identify whether the voltage of the ET signal 463 has a constant value. Based on whether the voltage of the ET signal 463 has a constant value, the mode selection module 1612 may activate or deactivate the first SM 620.

For example, the case in which the voltage of the ET signal 463 has a constant value may correspond to the case in which a voltage of an RF signal output from the RFIC 430 is constant. The case where the voltage of an RF signal is constant may be referenced substantially as the case where the electronic device 301 does not transmit an RF signal using the RFIC 430. Therefore, the mode selection module 1612 may deactivate the operation of the first SM 620. For example, deactivating the operation of the first SM 620 may be referenced as the case in which a voltage for driving the first SM 620 is not supplied. A mode in which the mode selection module 1612 deactivates the operation of the first SM 620 may be referenced as a first mode (or a deactivation mode).

For example, the case in which the voltage of the ET signal 463 has a variable value may correspond to the case in which a voltage of an RF signal output from the RFIC 430 is variable. The case where the voltage of an RF signal is variable may be referenced substantially as the case where the electronic device 301 transmits an RF signal using the RFIC 430. Therefore, the mode selection module 1612 may activate the operation of the first SM 620. For example, activating the operation of the first SM 620 may be referenced as the case in which a voltage for driving the first SM 620 is supplied. A mode in which the mode selection module 1612 activates the operation of the first SM 620 may be referenced as a second mode (or an activation mode).

According to an embodiment, the electronic device 301 may activate or deactivate the first SM 620 using the mode selection module 1612 based on the information associated with the amplitude of the ET signal 463 which is identified using the amplitude detector 1611. Through the above, the electronic device 301 may reduce or minimize the amount of power consumed by the first SM 620.

Although FIG. 16 of the disclosure has described the quantizer amplitude detector 1611 and the mode selection module 1612 as separate configurations, this is merely an example. For example, the quantizer amplitude detector 1611 and the mode selection module 1612 may be configured as software modules, such as the quantizer module 621, instead of hardware configurations. In this instance, the operation of the quantizer amplitude detector 1611 and the mode selection module 1612 may be referenced substantially as an operation performed by the SM 450 or the first SM 620.

Figure 17:
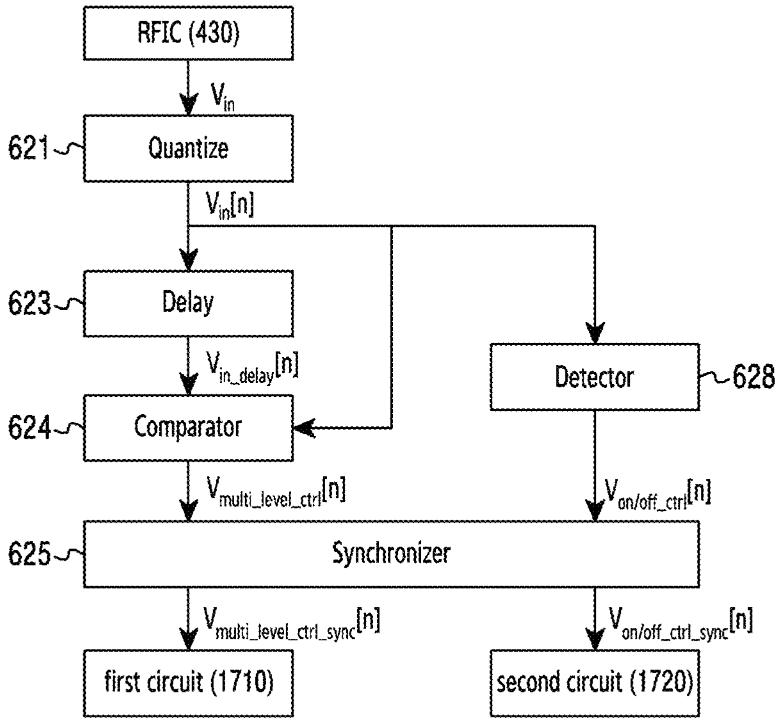
FIG. 17 illustrates a diagram of a first SM controlling a first circuit and a second circuit according to an embodiment of the disclosure.

FIG. 17 illustrates a diagram of a first SM that controls a first circuit and a second circuit according to an embodiment of the disclosure.

Referring to FIG. 8, the quantizer module 621 according to an embodiment may receive a predetermined signal (e.g., the ET signal 463) from an RFIC 1730. The quantizer module 621 may quantize a voltage of the predetermined signal.

For example, the voltage (Vin) of the predetermined signal may be an alternating voltage, and may consecutively vary over time. The quantizer module 621 may divide a voltage waveform of the predetermined signal into time periods in the time domain, and may identify a voltage value (e.g., binary number 010) of the predetermined signal for each time period. The identified voltage value (e.g., 010) of the signal may be a DC voltage having a constant value within a time period.

Although the RFIC 1730 of FIG. 17 in the disclosure may be substantially the same as or different from the RFIC 430 of FIG. 4. For example, the RFIC 1730 may correspond to the RFIC 430 of FIG. 4. For example, the RFIC 1730 may be an RFIC that is distinguished from the RFIC 430 of FIG. 4 and included in the electronic device 301. In this instance, the RFIC 430 may be a circuit for a first frequency band, and the RFIC 1730 may be a circuit for a second frequency band distinguished from the first frequency band.

According to an embodiment, the quantizer module 621 may quantize the voltage of the predetermined signal, so as to generate or identify a third digital signal.

According to an embodiment, the delay module 623 may receive the third digital signal from the quantizer module 621. For example, the third digital signal may have a quantized voltage ($V_{in}[n]$).

According to an embodiment, the delay module 623 (e.g., D-Flip Flop) may delay the third digital signal by a predetermined clock (e.g., 1 clock), so as to generate or identify a fourth digital signal. For example, the fourth digital signal may have a voltage ($V_{in\_delay}[n]$). Voltage values of the fourth digital signal may have time differences of the predetermined clock (e.g., 1 clock) from voltage values of a second digital signal.

According to an embodiment, the comparator 624 may receive the fourth digital signal from the delay module 623, and may receive the third digital signal from the quantizer module 621. For example, the comparator 624 may identify the voltage ($V_{in\_delay}[n]$) of the fourth digital signal, and may identify the quantized voltage ($V_{in}[n]$) of the third digital signal.

According to an embodiment, the comparator 624 may subtract the voltage of the fourth digital signal from the quantized voltage of the third digital signal. For example, the comparator 624 may subtract a voltage waveform of the fourth digital signal from a voltage waveform of the third digital signal.

According to an embodiment, the comparator 624 may generate a fourth control signal for controlling at least one lumped element (e.g., a capacitor, an inductor) included in a first circuit 1710 based on a difference between the quantized voltage of the third digital signal and the voltage of the fourth digital signal.

For example, the fourth control signal may be a signal for multi-level control associated with the first circuit 1710. That is, the fourth control signal may be a signal for controlling a plurality of lumped elements (e.g., a plurality of capacitors, a plurality of inductors) included in the first circuit 1710. For example, based on the fourth signal, at least some of the plurality of lumped elements included in the first circuit 1710 may be connected to or disconnected from a second circuit 1720.

For example, a voltage of the fourth control signal (or multi-level control signal) may be expressed as $V_{multi\_level\_ctrl}[n]$.

According to an embodiment, the detector 628 (e.g., an edge detector) may receive the third digital signal from the quantizer module 621. The detector 628 may generate a third control signal for the second circuit 1720 based on the voltage of the third digital signal. For example, the detector 628 may generate a first control signal for a configuration (e.g., a buck converter) included in the second circuit 1720 based on a change of a voltage waveform of the third digital signal. For example, the detector 628 may generate the third control signal for a converter (e.g., a buck converter) included in the second circuit 1720 based on a change of a voltage value of the waveform of the third digital signal.

For example, it is assumed that a voltage value of the third digital signal during a first time period is a first value (e.g., 001), a voltage value of the third digital signal during a second time period subsequent to the first time period is a second value (e.g., 011), and a voltage value of the third digital signal during a third time period subsequent to the second time period is a third value (e.g., 010). In this instance, as the time period is changed from the first time period to the second time period, the detector 628 may identify that a voltage value is changed from the first value to the second value which is higher than the first value. Based on the change of the voltage value (e.g., an increase of the voltage value), the detector 628 may generate the third control signal that performs adjustment so that the configuration (e.g., a buck converter) included in the second circuit 1720 is turned on during the second time period. As the time period is changed from the second time period to the third time period, the detector 628 may identify that the voltage value is changed from the second value to the third value which is lower than the second value. Based on the change of the voltage value (e.g., a decrease of the voltage value), the detector 628 may generate the third control signal that performs adjustment so that the configuration (e.g., a buck converter) included in the second circuit 1720 is turned off during the third time period.

For example, a voltage of the third control signal may be expressed as $V_{on/off\_ctrl}[n]$, and the voltage of the third control signal may be different for each time period.

According to an embodiment, the synchronization module 625 may receive or obtain the third control signal and the fourth control signal, and may synchronize the third control signal and the fourth control signal. For example, the synchronization module 625 may synchronize the third control signal and the fourth control signal in the time domain.

According to an embodiment, the synchronization module 625 may transmit the synchronized third control signal to the first circuit 1710, and may transmit the synchronized fourth control signal to the second circuit 1720. For example, the first circuit 1710 may control operations of configurations (e.g., at least one lumped element) included in the first circuit 1710 upon reception of the synchronized third control signal. For example, the operations of the configurations may refer to operations of connecting to or disconnecting from the second circuit 1720, respectively performed by the at least one lumped element. For example, the second circuit 1720 may control turning-on/off of a configuration (e.g., a buck converter) included in the second circuit 1720 upon reception of the synchronized fourth control signal.

For example, the voltage of the synchronized third control signal may be expressed as $V_{multi\_level\_ctrl\_sync}[n]$, and the voltage of the synchronized fourth control signal may be expressed as $V_{on/ff\_ctrl\_sync}[n]$.

Figure 18:
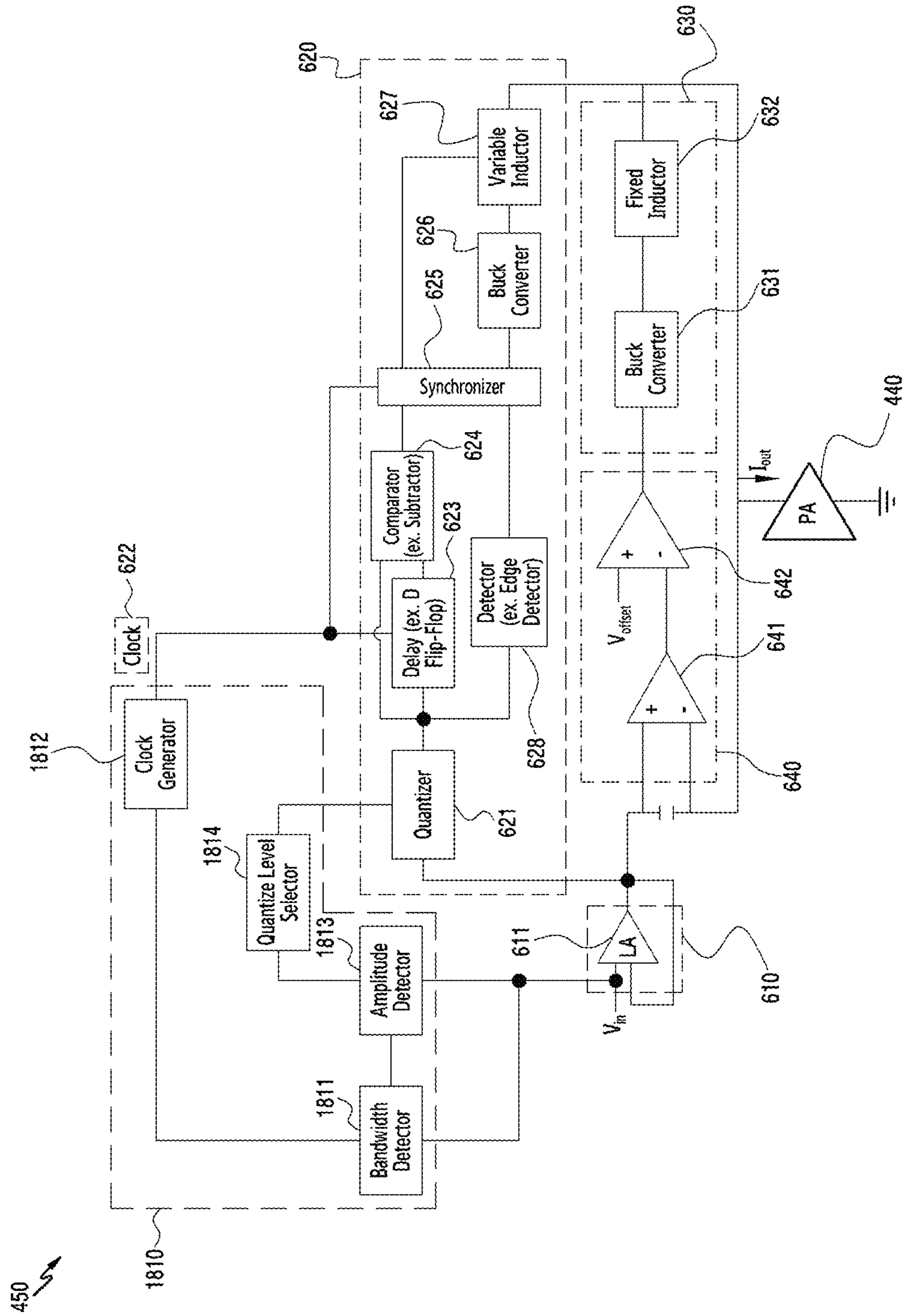
FIG. 18 illustrates a diagram of an SM including a bandwidth detector, a clock generator, an amplitude detector, and a quantizer level selector according to an embodiment of the disclosure.

FIG. 18 illustrates a diagram of an SM including a bandwidth detector, a clock generator, an amplitude detector, and a quantizer level selector according to an embodiment of the disclosure.

Referring to FIG. 18, the SM 450 according to an embodiment may include a bandwidth detector 1811, a clock generator 1812, an amplitude detector 1813, and/or a quantizer level selector 1814. For example, the SM 450 may include a circuit 1810, and the circuit 1810 may include the bandwidth detector 1811, the clock generator 1812, the amplitude detector 1813, and/or the quantizer level selector 1814.

For example, the bandwidth detector 1811 may be electrically connected to the clock generator 1812, and may detect a bandwidth of the ET signal 463 received from the RFIC 430. For example, the amplitude detector 1813 may be electrically connected to the quantizer level selector 1814, and may detect an amplitude of the ET signal 463 received from the RFIC 430.

The bandwidth detector 1811 of the disclosure may correspond to the bandwidth detector 1211 of FIG. 12, and the clock generator 1812 may correspond to the clock generator 1212 of FIG. 12. The amplitude detector 1813 of the disclosure may correspond to the amplitude detector 1311 of FIG. 13, and the quantizer level selector 1814 may correspond to the quantizer level selector 1312 of FIG. 13.

Accordingly, the embodiment of FIG. 18 of the disclosure may be an embodiment that combines the embodiment of FIG. 12 and the embodiment of FIG. 13. Therefore, also in FIG. 18, the bandwidth detector 1811 and the clock generator 1812 included in the SM 450 may determine a cycle of a clock (or a speed of a clock) based on a frequency, bandwidth, and/or cycle of the ET signal 463. In addition, also in FIG. 18, the amplitude detector 1813 and the quantizer level selector 1814 included in the SM 450 may determine the number of bit levels used for quantization to be proportional to a magnitude of an amplitude of a voltage waveform of the ET signal 463.

Figure 19:
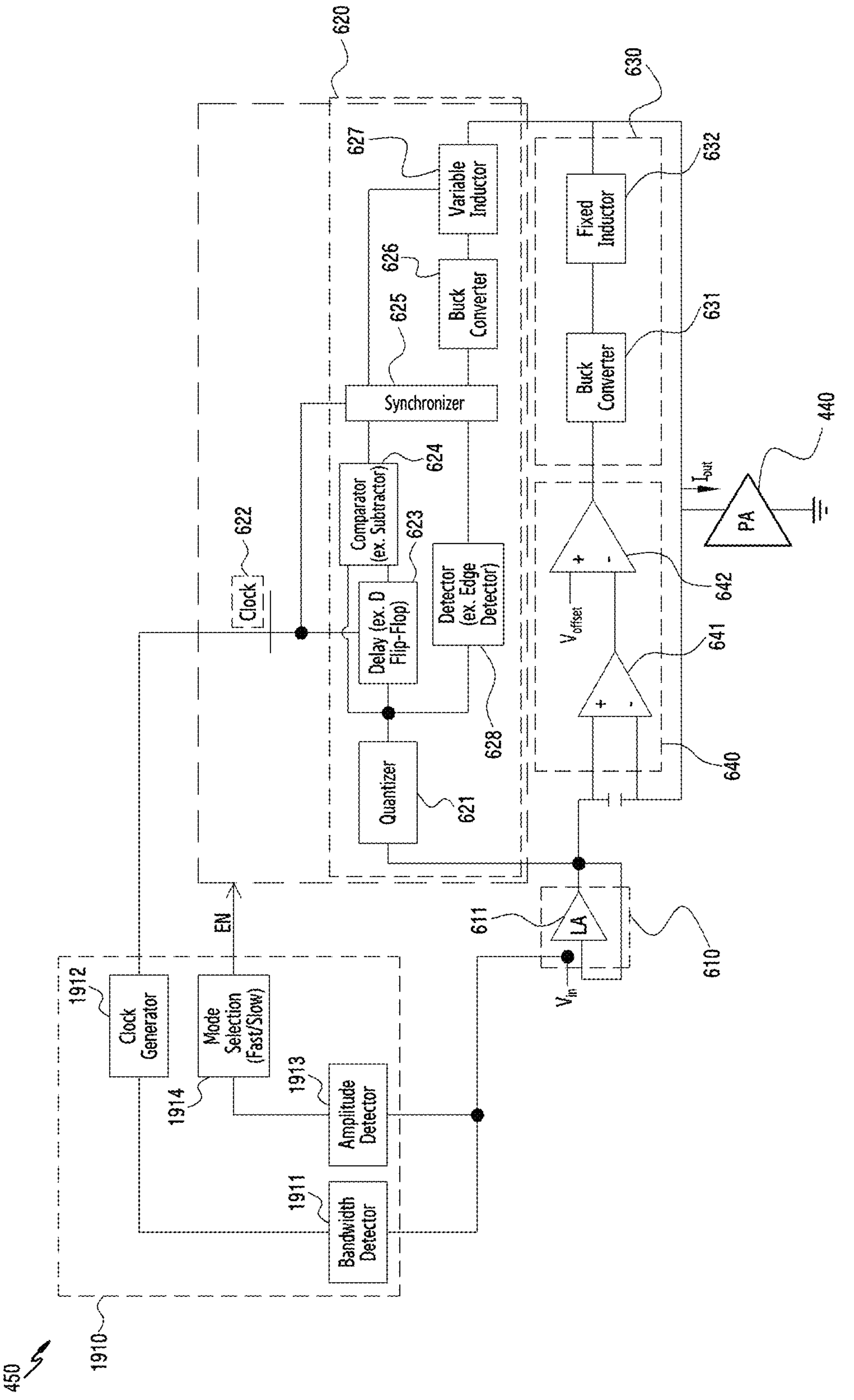
FIG. 19 illustrates a diagram of an SM including a bandwidth detector, a clock generator, an amplitude detector, and a mode selection module according to an embodiment of the disclosure.

FIG. 19 illustrates a diagram of an SM including a bandwidth detector, a clock generator, an amplitude detector, and a mode selection module according to an embodiment of the disclosure.

Referring to FIG. 19, the SM 450 according to an embodiment may include a bandwidth detector 1911, a clock generator 1912, an amplitude detector 1913, and/or a mode selection module 1914. For example, the SM 450 may include a circuit 1910, and the circuit 1910 may include the bandwidth detector 1911, the clock generator 1912, the amplitude detector 1913, and/or the mode selection module 1914.

For example, the bandwidth detector 1911 may be electrically connected to the clock generator 1912, and may detect a bandwidth of the ET signal 463 received from the RFIC 430. For example, the amplitude detector 1913 may be electrically connected to the mode selection module 1914, and may detect an amplitude of the ET signal 463 received from the RFIC 430.

The bandwidth detector 1911 of the disclosure may correspond to the bandwidth detector 1211 of FIG. 12, and the clock generator 1912 may correspond to the clock generator 1212 of FIG. 12. The amplitude detector 1913 of the disclosure may correspond to the amplitude detector 1311 of FIG. 13, and the mode selection module 1914 may correspond to the mode selection module 1612 of FIG. 16.

Accordingly, the embodiment of FIG. 19 of the disclosure may be an embodiment that combines the embodiment of FIG. 12 and the embodiment of FIG. 16. Therefore, also in FIG. 19, the bandwidth detector 1911 and the clock generator 1912 included in the SM 450 may determine a cycle of a clock (or a speed of a clock) based on a frequency, bandwidth, and/or cycle of the ET signal 463. In addition, also in FIG. 19, the amplitude detector 1913 and the mode selection module 1914 included in the SM 450 may activate or deactivate the first SM 620 based on a magnitude of an amplitude of a voltage waveform of the ET signal 463.

Figure 20:
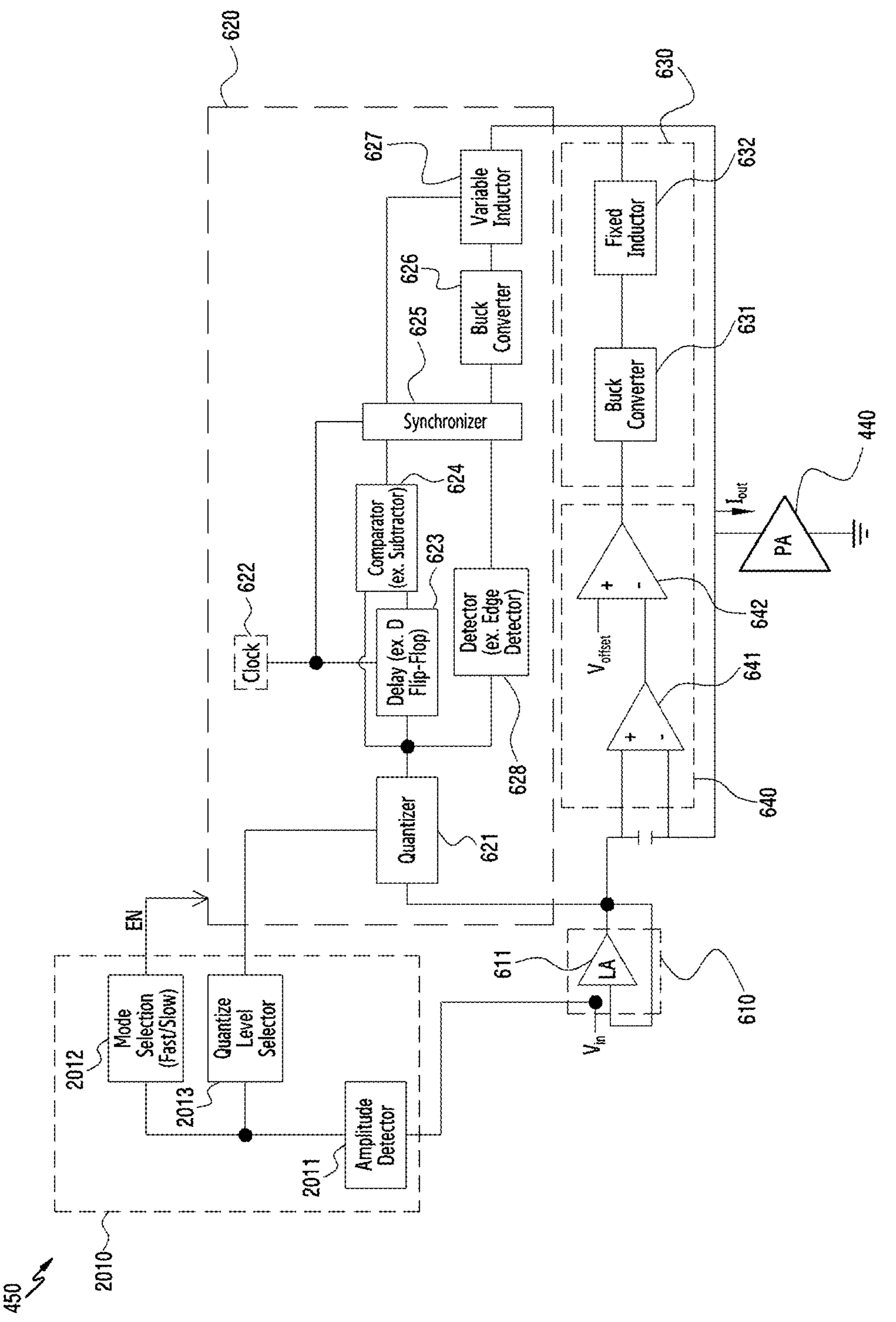
FIG. 20 illustrates a diagram of an SM including an amplitude detector, a quantizer level selector, and a mode selection module according to an embodiment of the disclosure.

FIG. 20 illustrates a diagram of an SM including an amplitude detector, a quantizer level selector, and a mode selection module according to an embodiment of the disclosure.

Referring to FIG. 20, the SM 450 according to an embodiment may include an amplitude detector 2011, a mode selection module 2012, and/or a quantizer level selector 2013. For example, the SM 450 may include a circuit 2010, and the circuit 2010 may include the amplitude detector 2011, the mode selection module 2012, and/or the quantizer level selector 2013.

For example, the amplitude detector 2011 may be electrically connected to the mode selection module 2012 and the quantizer level selector 2013, and may detect an amplitude of the ET signal 463 received from the RFIC 430.

The amplitude detector 2011 of the disclosure may correspond to the amplitude detector 1311 of FIG. 13, and the mode selection module 2012 may correspond to the mode selection module 1612 of FIG. 16. The quantizer level selector 2013 may correspond to the quantizer level selector 2013 of FIG. 13.

Accordingly, the embodiment of FIG. 20 of the disclosure may be an embodiment that combines the embodiment of FIG. 13 and the embodiment of FIG. 16.

Figure 21:
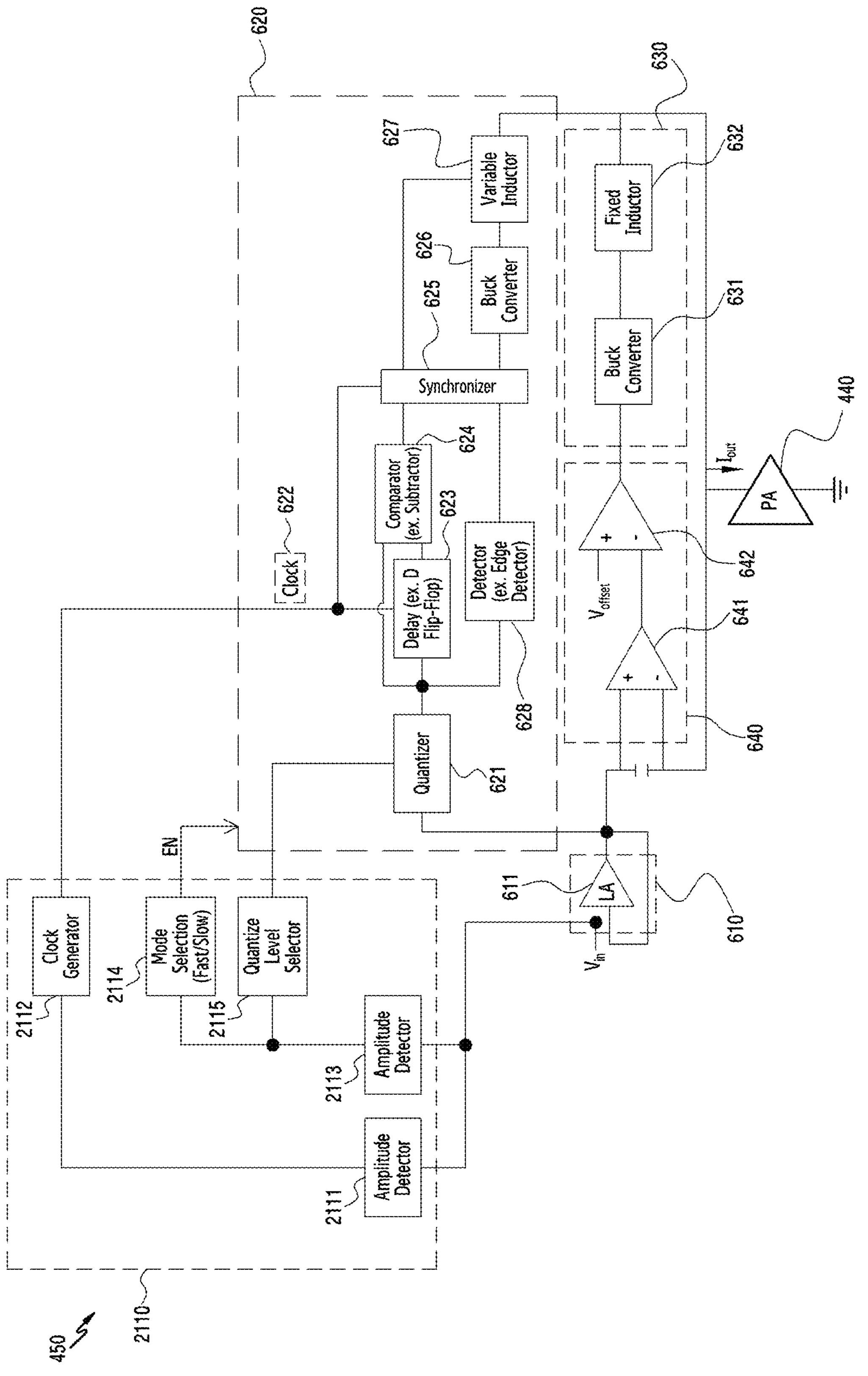
FIG. 21 illustrates a diagram of an SM including a bandwidth detector, a clock generator, an amplitude detector, a quantizer level selector, and a mode selection module according to an embodiment of the disclosure.

FIG. 21 illustrates a diagram of an SM including a bandwidth detector, a clock generator, an amplitude detector, a quantizer level selector, and a mode selection module according to an embodiment of the disclosure.

Referring to FIG. 21, the SM 450 according to an embodiment may include a bandwidth detector 2111, a clock generator 2112, an amplitude detector 2113, a mode selection module 2114, and/or a quantizer level selector 2115. For example, the SM 450 may include a circuit 2110, and the circuit 2110 may include the bandwidth detector 2111, the clock generator 2112, the amplitude detector 2113, the mode selection module 2114, and/or the quantizer level selector 2115.

For example, the bandwidth detector 2111 may be electrically connected to the clock generator 2112, and may detect a bandwidth of the ET signal 463 received from the RFIC 430. For example, the amplitude detector 2113 may be electrically connected to the mode selection module 2114 and the quantizer level selector 2115, and may detect an amplitude of the ET signal 463 received from the RFIC 430.

The bandwidth detector 2111 of the disclosure may correspond to the bandwidth detector 1211 of FIG. 12, and the clock generator 2112 may correspond to the clock generator 1212 of FIG. 12.

The amplitude detector 2113 of the disclosure may correspond to the amplitude detector 1311 of FIG. 13, and the mode selection module 2114 may correspond to the mode selection module 1612 of FIG. 16. The quantizer level selector 2115 may correspond to the quantizer level selector 2013 of FIG. 13.

Accordingly, the embodiment of FIG. 20 of the disclosure may be an embodiment that combines the embodiment of FIG. 12, the embodiment of FIG. 13, and the embodiment of FIG. 16.

According to an embodiment, the electronic device 301 in a wireless communication system may include a PA and an SM configured to supply power to the PA, and the SM may include a linear SM to which a signal for an envelope tracking (ET) is input, and a first SM that is connected to the linear SM, the first SM may include a first converter for direct current (DC)-DC conversion and at least one lumped element connected to the first converter, and the first SM may be configured to convert the signal for the ET into a first digital signal, to generate a first control signal for the first converter based on a change of a voltage value of the first digital signal, to generate a second digital signal by delaying the first digital signal by a predetermined clock, and to control the at least one lumped element based on the first digital signal and the second digital signal to adjust a current output from the first SM.

According to an embodiment, the at least one lumped element may include a plurality of inductors selectively connected to the first converter, and the first SM may be configured to generate a second control signal for the plurality of inductors based on a difference between the voltage value of the first digital signal and a voltage value of the second digital signal.

According to an embodiment, the first control signal and the second control signal may be synchronized based on the predetermined clock.

According to an embodiment, the electronic device 301 may further include a second SM including a second converter for DC-DC conversion and an inductor that is connected to the second converter, and the inductor may have a constant inductance value.

According to an embodiment, the electronic device 301 may further include a circuit electrically connecting the linear SM and the second SM, and the circuit may be configured to selectively transfer, to the second SM, a signal output from the linear SM based on a voltage value of the signal output from the linear SM.

According to an embodiment, the first SM may be connected to a first node of a first connection line connecting the linear SM and the second SM and connected to a second node of a second connection line that connects the second SM and the PA, the first SM may be configured to receive a first current output from the linear SM and output a second current to the PA via the second connection line, and the second current output from the first SM may be based on the first current output from the linear SM.

According to an embodiment, the electronic device 301 may further include a radio frequency integrated circuit (RFIC), and the RFIC may be configured to input a radio frequency (RF) signal into the PA, and to input the signal for the ET to the SM.

According to an embodiment, the signal for the ET may have consecutive voltage values during a predetermined period of time, and the first SM may be configured to convert the signal for the ET into the first digital signal by quantizing the consecutive voltage values into a predetermined value.

According to an embodiment, the first digital signal may have a first voltage value during a first time, and may have a second voltage value during a second time subsequent to the first time, and the first SM may be further configured to compare the first voltage value and the second voltage value, to generate the first control signal for controlling the first converter to be turned on in case that the first voltage value is less than the second voltage value, and to generate the first control signal for controlling the first converter to be turned off in case that the first voltage value is greater than the second voltage value.

According to an embodiment, the SM may be configured to identify a bandwidth of the signal for the ET, and to determine a clock speed of the predetermined clock based on the bandwidth, and the clock speed may be configured to be inversely proportional to the bandwidth.

According to an embodiment, the SM may be configured to identify a maximum voltage value and a minimum voltage value of the signal for the ET and to determine an interval for quantizing the consecutive voltage values of the signal into a predetermined value based on a difference between the maximum voltage value and the minimum voltage value of the signal for the ET, and the interval may be proportional to the difference between the maximum voltage value and the minimum voltage value.

According to an embodiment, the electronic device 301 may further include a memory storing a look-up table (LUT) including the interval mapped to the difference between the maximum voltage value and the minimum voltage value.

According to an embodiment, the SM may be further configured to compare a first voltage of the signal for the ET and a second voltage of the first digital signal, to change the interval from a first interval to a second interval which is smaller than the first interval when a difference between the first voltage and the second voltage is greater than a threshold value, and to change the interval from the first interval to a third interval which is larger than the first interval when the difference between the first voltage and the second voltage is less than the threshold value.

According to an embodiment, the SM may be configured to identify whether the signal for the ET has a DC voltage, and to deactivate the first SM when the signal has a DC voltage.

According to an embodiment, the first SM may be further configured to generate the second digital signal by shifting the first digital signal by the predetermined clock in the time domain.

According to an embodiment, an electronic device in a wireless communication system may include a PA and a supply modulator (SM) configured to supply power to the PA, and the SM may further include a linear SM to which a signal for an envelope tracking (ET) is input, a first SM connected to the linear SM, the first SM including a first converter for direct current (DC)-DC conversion and at least one lumped element connected to the first converter, and a second SM including a second converter for DC-DC conversion and an inductor connected to the second converter, the inductor may have a constant inductance value, and the first SM is configured to convert the signal for the ET into a first digital signal, to generate a first control signal for the first converter based on a change of a voltage value of the first digital signal, to generate a second digital signal by delaying the first digital signal by a predetermined clock, and to adjust a current output from the first SM by controlling the at least one lumped element based on the first digital signal and the second digital signal.

According to an embodiment, the at least one lumped element may include a plurality of inductors selectively connected to the first converter, and the first SM may be configured to generate a second control signal for the plurality of inductors based on a difference between the voltage value of the first digital signal and a voltage value of the second digital signal.

According to an embodiment, the first control signal and the second control signal may be synchronized based on the predetermined clock.

According to an embodiment, the electronic device 301 may further include a circuit that electrically connects the linear SM and the second SM, and the circuit may be configured to selectively transfer, to the second SM, a signal output from the linear SM based on a voltage value of the signal output from the linear SM.

According to an embodiment, the first SM may be connected to a first node of a first connection line connecting the linear SM and the second SM and connected to a second node of a second connection line that connects the second SM and the PA, the first SM may be configured to receive a first current output from the linear SM and output a second current to the PA via the second connection line, and the second current output from the first SM may be based on the first current output from the linear SM.

Although the specification and attached drawings have disclosed the embodiments of the disclosure, and have used specific terms, these are to describe the technical contents of the disclosure easily and help the understanding of the disclosure but are not intended to limit the scope of the disclosure thereto. It is apparent to those skilled in the technical field of the disclosure that other modifications based on the technical idea of the disclosure are possible.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device in a wireless communication system, the electronic device comprising:
- a power amplifier (PA); and
- a supply modulator (SM) configured to supply power to the PA,
- wherein the SM comprises:
  - a linear SM to which a signal for an envelope tracking (ET) is input, and
  - a first SM connected to the linear SM and comprising a first converter for direct current (DC)-DC conversion and at least one lumped element connected to the first converter, and
- wherein the first SM is configured to:
  - convert the signal for the ET into a first digital signal,
  - generate a first control signal for the first converter based on a change of a voltage value of the first digital signal,
  - generate a second digital signal by delaying the first digital signal by a predetermined clock, and
  - control the at least one lumped element based on the first digital signal and the second digital signal to adjust a current output from the first SM.

2. The electronic device of claim 1, wherein the at least one lumped element comprises a plurality of inductors selectively connected to the first converter, and
- wherein the first SM is configured to generate a second control signal for the plurality of inductors based on a difference between the voltage value of the first digital signal and a voltage value of the second digital signal.

3. The electronic device of claim 2, wherein the first control signal and the second control signal are synchronized based on the predetermined clock.

4. The electronic device of claim 1, further comprising:
- a second SM comprising a second converter for DC-DC conversion and an inductor that is connected to the second converter,
- wherein the inductor has a constant inductance value.

5. The electronic device of claim 4, further comprising:
- a circuit electrically connecting the linear SM and the second SM,
- wherein the circuit is configured to selectively transfer, to the second SM, a signal output from the linear SM based on a voltage value of the signal output from the linear SM.

6. The electronic device of claim 4, wherein the first SM is connected to a first node of a first connection line connecting the linear SM and the second SM and connected to a second node of a second connection line that connects the second SM and the PA,
- wherein the first SM is configured to receive a first current output from the linear SM and output a second current to the PA via the second connection line, and
- wherein the second current output from the first SM is based on the first current output from the linear SM.

7. The electronic device of claim 1, further comprising:
- a radio frequency integrated circuit (RFIC),
- wherein the RFIC is configured to input a radio frequency (RF) signal into the PA, and to input the signal for the ET to the SM.

8. The electronic device of claim 1, wherein the signal for the ET has consecutive voltage values during a predetermined period of time, and
- wherein the first SM is configured to convert the signal for the ET into the first digital signal by quantizing the consecutive voltage values into a predetermined value.

9. The electronic device of claim 8, wherein the first digital signal has a first voltage value during a first time, and has a second voltage value during a second time subsequent to the first time, and
- wherein the first SM is further configured to:
  - compare the first voltage value and the second voltage value,
  - in case that the first voltage value is less than the second voltage value, generate the first control signal for controlling the first converter to be turned on, and
  - in case that the first voltage value is greater than the second voltage value, generate the first control signal for controlling the first converter to be turned off.

10. The electronic device of claim 1, wherein the SM is configured to:
- identify a bandwidth of the signal for the ET, and
- determine a clock speed of the predetermined clock based on the bandwidth, and
- wherein the clock speed is configured to be inversely proportional to the bandwidth.

11. The electronic device of claim 1, wherein the SM is configured to:
- identify a maximum voltage value and a minimum voltage value of the signal for the ET; and
- determine an interval for quantizing consecutive voltage values of the signal into a predetermined value based on a difference between the maximum voltage value and the minimum voltage value of the signal for the ET, and
- wherein the interval is proportional to the difference between the maximum voltage value and the minimum voltage value.

12. The electronic device of claim 11, further comprising:
- a memory storing a look-up table (LUT) comprising the interval mapped to the difference between the maximum voltage value and the minimum voltage value.

13. The electronic device of claim 11, wherein the SM is further configured to:
- compare a first voltage of the signal for the ET and a second voltage of the first digital signal,
- in case that a difference between the first voltage and the second voltage is greater than a threshold value, change the interval from a first interval to a second interval which is smaller than the first interval, and in case that the difference between the first voltage and the second voltage is less than the threshold value, change the interval from the first interval to a third interval which is larger than the first interval.

14. The electronic device of claim 1, wherein the SM is configured to:

identify whether the signal for the ET has a DC voltage, and in case that the signal has a DC voltage, deactivate the first SM.

15. The electronic device of claim 1, wherein the first SM is further configured to generate the second digital signal by shifting the first digital signal by the predetermined clock in a time domain.

16. An electronic device in a wireless communication system, the electronic device comprising:

a power amplifier (PA); and a supply modulator (SM) configured to supply power to the PA, wherein the SM further comprises:

a linear SM to which a signal for an envelope tracking (ET) is input, a first SM connected to the linear SM, and comprising a first converter for direct current (DC)-DC conversion and at least one lumped element connected to the first converter, and a second SM comprising a second converter for DC-DC conversion and an inductor connected to the second converter, wherein the inductor has a constant inductance value, and wherein the first SM is configured to:

convert the signal for the ET into a first digital signal, generate a first control signal for the first converter based on a change of a voltage value of the first digital signal, generate a second digital signal by delaying the first digital signal by a predetermined clock, and control the at least one lumped element based on the first digital signal and the second digital signal to adjust a current output from the first SM.

17. The electronic device of claim 16, wherein the at least one lumped element comprises a plurality of inductors selectively connected to the first converter, and wherein the first SM is configured to generate a second control signal for the plurality of inductors based on a difference between the voltage value of the first digital signal and a voltage value of the second digital signal.

18. The electronic device of claim 17, wherein the first control signal and the second control signal are synchronized based on the predetermined clock.

19. The electronic device of claim 16, further comprising:

a circuit that electrically connects the linear SM and the second SM, wherein the circuit is configured to selectively transfer, to the second SM, a signal output from the linear SM based on a voltage value of the signal output from the linear SM.

20. The electronic device of claim 19, wherein the first SM is connected to a first node of a first connection line connecting the linear SM and the second SM and connected to a second node of a second connection line that connects the second SM and the PA, wherein the first SM is configured to receive a first current output from the linear SM and output a second current to the PA via the second connection line, and wherein the second current output from the first SM is based on the first current output from the linear SM.

* * * * *